United States Patent
Debbage et al.

(10) Patent No.: US 9,734,077 B2
(45) Date of Patent: *Aug. 15, 2017

(54) SENDING PACKETS USING OPTIMIZED PIO WRITE SEQUENCES WITHOUT SFENCES

(71) Applicant: Intel Corporation, Santa Clara, CA (US)

(72) Inventors: Mark Debbage, Santa Clara, CA (US); Yatin M. Mutha, Pune (IN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/277,527

(22) Filed: Sep. 27, 2016

(65) Prior Publication Data

US 2017/0017465 A1 Jan. 19, 2017

Related U.S. Application Data

(63) Continuation of application No. 14/316,670, filed on Jun. 26, 2014, now Pat. No. 9,460,019.

(51) Int. Cl.
*G06F 12/08* (2016.01)
*G06F 13/42* (2006.01)
(Continued)

(52) U.S. Cl.
CPC .......... *G06F 12/0875* (2013.01); *G06F 5/065* (2013.01); *G06F 5/14* (2013.01);
(Continued)

(58) Field of Classification Search
CPC .............................. G06F 9/3851; G06F 9/3836
See application file for complete search history.

(56) References Cited

U.S. PATENT DOCUMENTS

| 5,790,887 A | 8/1998 | Brech |
| 6,965,563 B1 * | 11/2005 | Hospodor ........... H04L 12/5695 |
| | | 360/72.1 |

(Continued)

FOREIGN PATENT DOCUMENTS

| EP | 2565795 A2 | 3/2013 |
| WO | 2015/199946 A1 | 12/2015 |
| WO | 2015/199947 A1 | 12/2015 |

OTHER PUBLICATIONS

International Search Report and Written Opinion received for PCT Patent Application No. PCT/US2015/034359, mailed on Aug. 31, 2015, 11 pages.

(Continued)

*Primary Examiner* — Ernest Unelus
*Assistant Examiner* — Ronald Modo
(74) *Attorney, Agent, or Firm* — Law Office of R. Alan Burnett, PS

(57) ABSTRACT

Method and apparatus for sending packets using optimized PIO write sequences without sfences. Sequences of Programmed Input/Output (PIO) write instructions to write packet data to a PIO send memory are received at a processor supporting out of order execution. The PIO write instructions are received in an original order and executed out of order, with each PIO write instruction writing a store unit of data to a store buffer or a store block of data to the store buffer. Logic is provided for the store buffer to detect when store blocks are filled, resulting in the data in those store blocks being drained via PCIe posted writes that are written to send blocks in the PIO send memory at addresses defined by the PIO write instructions. Logic is employed for detecting the fill size of packets and when a packet's send blocks have been filled, enabling the packet data to be eligible for egress.

14 Claims, 25 Drawing Sheets

(51) Int. Cl.
*G06F 5/14* (2006.01)
*G06F 13/28* (2006.01)
*G06F 9/30* (2006.01)
*G06F 9/38* (2006.01)
*G06F 12/0875* (2016.01)
*G06F 5/06* (2006.01)

(52) U.S. Cl.
CPC ...... *G06F 9/30043* (2013.01); *G06F 9/30087* (2013.01); *G06F 9/3834* (2013.01); *G06F 9/3851* (2013.01); *G06F 13/28* (2013.01); *G06F 13/4282* (2013.01); *G06F 2205/067* (2013.01); *G06F 2205/126* (2013.01); *G06F 2212/452* (2013.01)

(56) References Cited

U.S. PATENT DOCUMENTS

| | | |
|---|---|---|
| 8,122,177 B1 | 2/2012 | Puranik |
| 8,213,294 B2 | 7/2012 | Arndt et al. |
| 8,244,962 B2 | 8/2012 | Swing et al. |
| 2005/0114623 A1 | 5/2005 | Craddock et al. |
| 2006/0056405 A1 | 3/2006 | Chang et al. |
| 2007/0192530 A1 | 8/2007 | Pedersen et al. |
| 2009/0198918 A1 | 8/2009 | Arimilli et al. |
| 2011/0145450 A1 | 6/2011 | Mansingh |

OTHER PUBLICATIONS

International Search Report and Written Opinion received for PCT Patent Application No. PCT/US2015/034437, mailed on Sep. 30, 2015, 10 pages.

\* cited by examiner

SENDING PACKETS USING OPTIMIZED PIO WRITE SEQUENCES WITHOUT SFENCES

RELATED APPLICATION

The present application is a divisional of U.S. patent application Ser. No. 14/316,670, filed on Jun. 26, 2014, entitled "SENDING PACKETS USING OPTIMIZED PIO WRITE SEQUENCES WITHOUT SFENCES", which is hereby incorporated herein by reference in its entirety and all purposes.

BACKGROUND INFORMATION

High-performance computing (HPC) has seen a substantial increase in usage and interests in recent years. Historically, HPC was generally associated with so-called "Super computers." Supercomputers were introduced in the 1960s, made initially and, for decades, primarily by Seymour Cray at Control Data Corporation (CDC), Cray Research and subsequent companies bearing Cray's name or monogram. While the supercomputers of the 1970s used only a few processors, in the 1990s machines with thousands of processors began to appear, and more recently massively parallel supercomputers with hundreds of thousands of "off-the-shelf" processors have been implemented.

There are many types of HPC architectures, both implemented and research-oriented, along with various levels of scale and performance. However, a common thread is the interconnection of a large number of compute units, such as processors and/or processor cores, to cooperatively perform tasks in a parallel manner. Under recent System on a Chip (SoC) designs and proposals, dozens of processor cores or the like are implemented on a single SoC, using a 2-dimensional (2D) array, torus, ring, or other configuration. Additionally, researchers have proposed 3D SoCs under which 100's or even 1000's of processor cores are interconnected in a 3D array. Separate multicore processors and SoCs may also be closely-spaced on server boards, which, in turn, are interconnected in communication via a backplane or the like. Another common approach is to interconnect compute units in racks of servers (e.g., blade servers and modules). IBM's Sequoia, alleged to have once been the world's fastest supercomputer, comprises 96 racks of server blades/modules totaling 1,572,864 cores, and consumes a whopping 7.9 Megawatts when operating under peak performance.

One of the performance bottlenecks for HPCs is the latencies resulting from transferring data over the interconnects between compute nodes. Typically, the interconnects are structured in an interconnect hierarchy, with the highest speed and shortest interconnects within the processors/SoCs at the top of the hierarchy, while the latencies increase as you progress down the hierarchy levels. For example, after the processor/SoC level, the interconnect hierarchy may include an inter-processor interconnect level, an inter-board interconnect level, and one or more additional levels connecting individual servers or aggregations of individual servers with servers/aggregations in other racks.

Recently, interconnect links having speeds of 100 Gigabits per second (100 Gb/s) have been introduced, such as specified in the IEEE 802.3bj Draft Standard, which defines Physical Layer (PHY) specifications and management parameters for 100 Gb/s operation over backplanes and copper cables. Mesh-like interconnect structures including links having similar (to 100 Gb/s) speeds are being developed and designed for HPC environments. The availability of such high-speed links and interconnects shifts the performance limitation from the fabric to the software generation of packets and the handling of packet data to be transferred to and from the interconnect.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
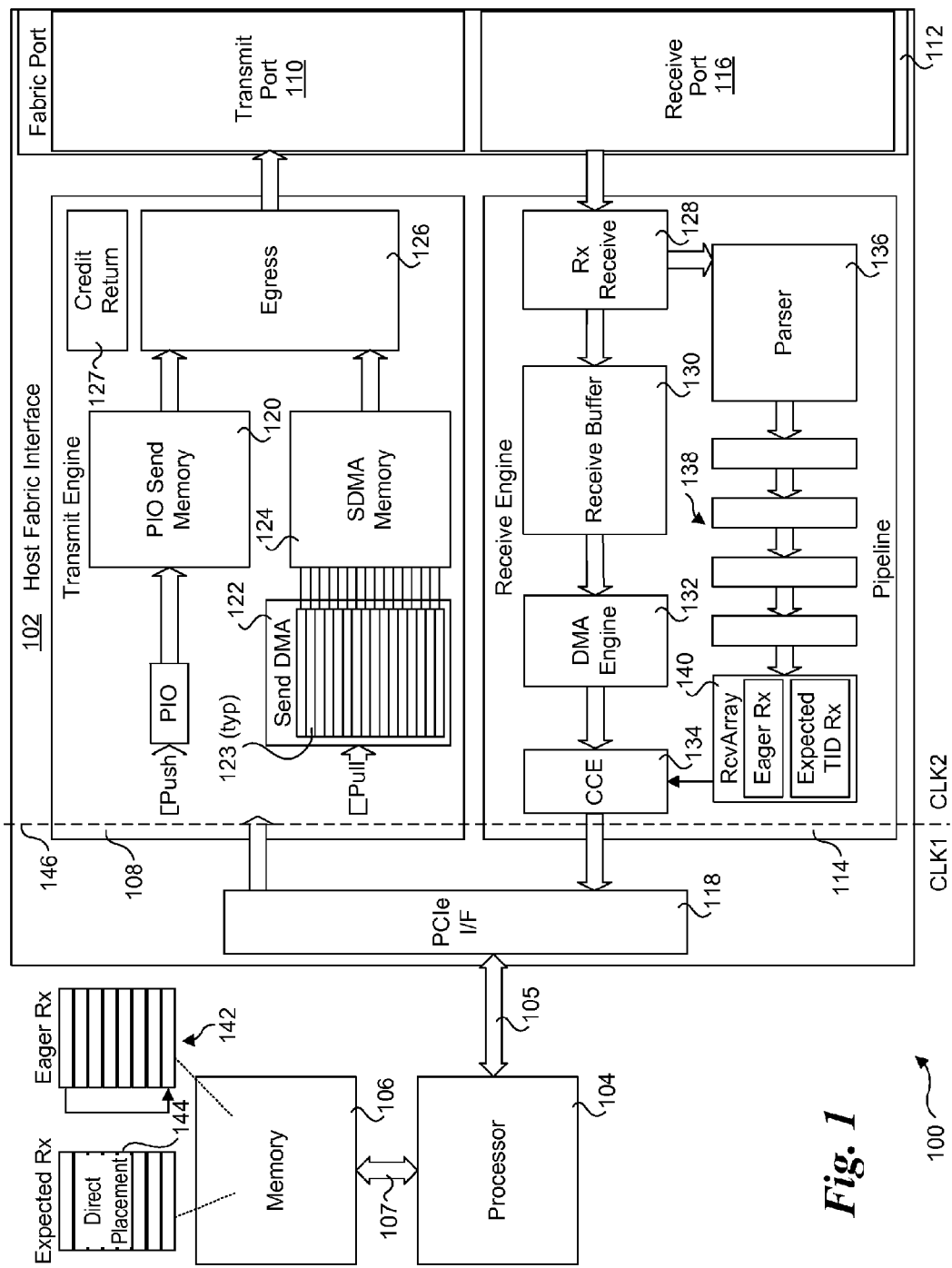
FIG. 1 is a schematic diagram of a system including a Host Fabric Interface (HFI), according to one embodiment.

Embodiments of methods and apparatus for sending packets using optimized PIO write sequences without sfences are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that are shown in the drawing Figures but not labeled for simplicity and clarity. Conversely, "(typ)" is not to be construed as meaning the component, element, etc. is typically used for its disclosed function, implementation, purpose, etc.

FIG. 1 shows an exemplary system 100 that is used herein for illustrating aspects of packet data handling techniques that facilitate increased packet data throughput between system memory and fabric interfaces. System 100 includes a host fabric interface (HFI) 102 coupled to a host processor 104 via a Peripheral Component Internet Express (PCIe) interconnect 105, which in turn is coupled to memory 106 (which is also commonly referred to as system memory) via a memory interconnect 107. HFI 102 includes a transmit engine 108 coupled to a transmit port 110 of a fabric port 112, and a receive engine 114 coupled to a receive port 116 of fabric port 112. Each of transmit engine 108 and receive engine 114 are also coupled to a PCIe interface (I/F) 118 that facilitates communication between HFI 102 and processor 104 via PCIe interconnect 105.

Transmit engine 108 includes a send memory 120, a Send Direct Memory Access (Send DMA) block 122 including a plurality of Send DMA (SDMA) engines 123, a buffer 124, an egress block 126, and a credit return mechanism 127. Receive engine 114 includes an Rx receive block 128, a receive buffer 130, a DMA engine 132, a Central Control Engine (CCE) 134, a parser 136, a set of pipeline blocks 138 and a receive register array (RcvArray) 140.

Transmit engine 108, also referred to as a "send" engine, generates packets for egress to the fabric link (e.g., a fabric link coupled to transmit port 110, not shown). The two different mechanisms provided by the send engine are PIO Send and Send DMA.

PIO Send is short for "Programmed Input/Output" Send. PIO is also known to some as "Memory-mapped Input/Output" (MMIO). For PIO Send host processor 104 generates a packet by writing the header and payload of the packet into a memory-mapped send buffer using store instructions. PIO Send can be viewed as a packet "push" in the sense that the processor pushes the packet to HFI 102. The send buffer implemented in send memory 120 is in the physical address space of the adapter, so that processor writes to a send buffer turn into PCIe write transactions that are transferred over PCIe interconnect 105 and PCIe interface 118 to send memory 120.

A number of send buffers in send memory 120 plus the mechanism used to return send buffer credits back to host processor 104 is called a "send context." In one embodiment, up to 160 independent send contexts are provided by HFI 102, allowing up to 160 concurrent independent users of the PIO Send mechanism. PIO Send can be used directly from user-mode software by mapping a send context directly into a user process's virtual address map.

PIO Send provides a very low overhead send mechanism that delivers low latency and high message rate for sent packets. The write-combining and store buffer features of host processor 104 are used, where appropriate, to aggregate smaller writes into 64 B (Byte) writes over the PCIe interconnect and interface to improve bandwidth. Since host processor 104 is involved in writing the bytes of the packet to the send buffer (essentially a memory copy), the PIO Send mechanism is processor intensive. These performance characteristics make the PIO Send highly optimized for small to medium sized messages.

Send Direct Memory Access, abbreviated to Send DMA or SDMA, eliminates the processor memory copy so that packets can be sent to transmit engine 108 with significantly lower processor utilization. Instead of pushing packets to HFI 102 using processor writes as in the PIO Send mechanism, an SDMA engine 123 in Send DMA block 122 pulls packet header and payload directly from host memory 106 to form a packet that egresses to the fabric link. In one embodiment, Send DMA block 122 supports 16 independent SDMA engines 123 and each is associated with its own SDMA queue.

Both Send PIO and SDMA use a store-and-forward approach to sending the packet. The header and payload has to be fully received by a send buffer on transmit engine 108 before the packet can begin to egress to the link. Send buffer memory is provided on HFI 102 for this purpose, and separate send buffer memory is provided for Send PIO and for SDMA, as shown in FIG. 1 as send memory 120 and SDMA buffer 124. In one embodiment, this partitioning is hard-wired into the HFI design and is not software configurable. However, send memory 120 for Send PIO can be assigned to send contexts under software control at the granularity of send buffer credits. Similarly, the send buffer memory in SDMA buffer 124 can be assigned to SDMA engine 123 at the same granularity.

The basic function of receive engine 114 is to separate the header and payload of inbound (from the fabric) packets, received at receive port 116, and write the packet header and payload data into host memory 106. In one embodiment, packet data destined for HFI 102 is transferred via the fabric's links as streams of data units comprising "flits" (flit streams) that are received at receive port 116, where the flits are reassembled into packets, which are then forwarded to receive engine 114. Incoming packet data is first processed at Rx receive block 128, where various fields in the packet's header are extracted and checked to determine the type of packet. The packet data (its data payload) is buffered in receive buffer 130, while the packet header is forwarded to parser 136, which parses the header data to extract its destination address and other field data, with further operations being performed by pipeline operations 138. In conjunction with applicable pipeline operations, packet data is read from receive buffer 130 and forwarded via a DMA engine 132, which is configured to forward the packet data to memory 106 via PCIe DMA writes.

FIG. 1 further depicts a vertical dashed line 146 used to show use of two clock domains, as depicted by CLK1 and CLK2. In some embodiments, the clock frequency used for PCIe interface 118 may differ from the clock frequency used for the rest of the HFI components, with separate reference clocks used for each clock domain. Although not shown, the clock domain used within transmit port 110 and receive port 116 may also be separate from the clock domain employed by transmit engine 108 and receive engine 114.

Figure 2:
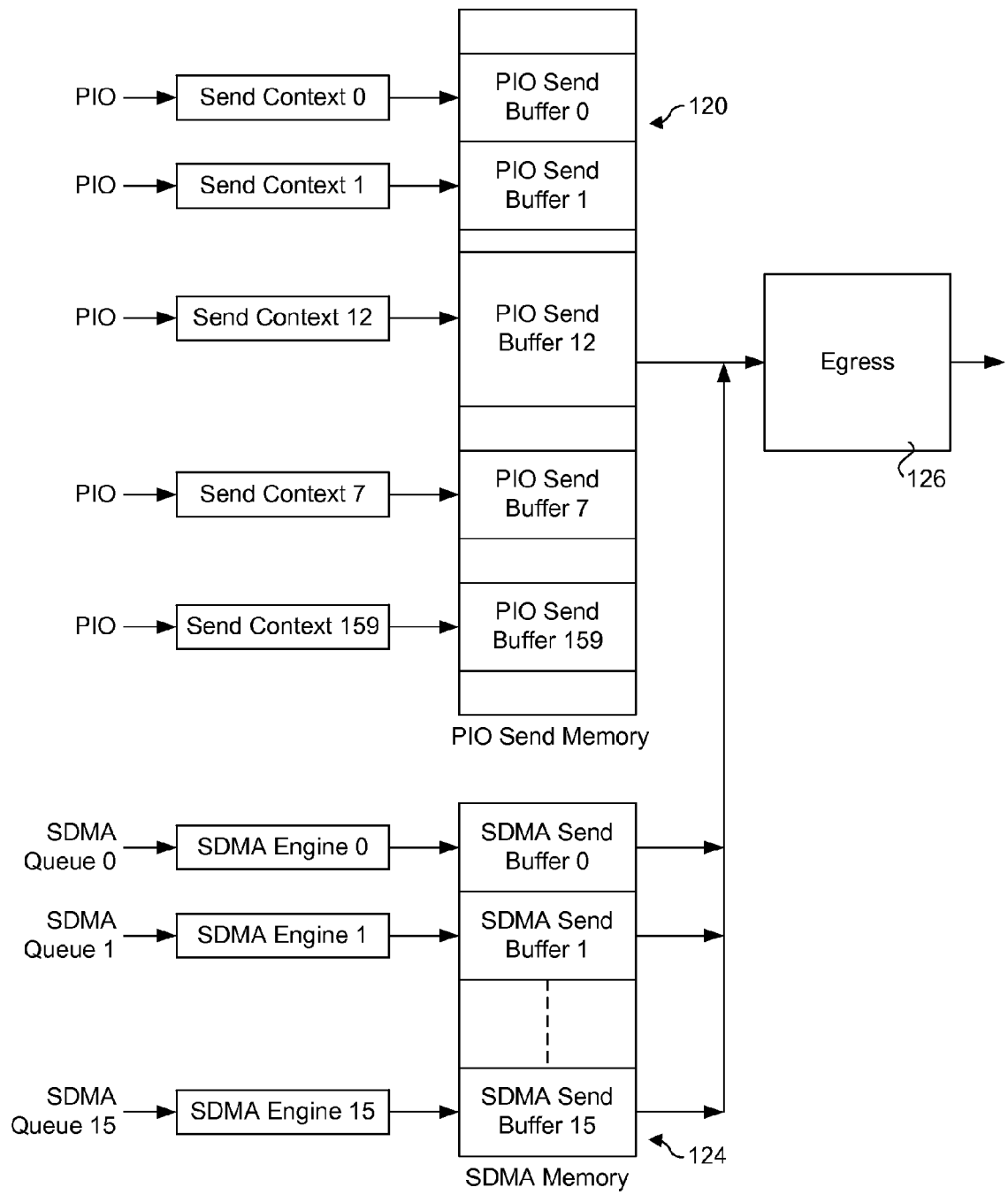
FIG. 2 is a schematic diagram illustrating various aspects of a PIO send memory and an SDMA memory, according to one embodiment.

FIG. 2 illustrates further details of Send PIO and SDMA operations. As shown, up to 160 send contexts may be employed in connection with Send PIO packet data. Each send context comprises a contiguous slice of PIO send memory 120 that is allocated to that send context. The send buffer for a send context will therefore be contiguous in host physical address space. The normal mapping of this send buffer into user virtual address space for user processes will also typically be virtually contiguous. In one embodiment, send blocks in a send buffer comprise 64 B blocks, such that each send context comprises n×64 B, where n is an integer >0. In one embodiment, the send blocks are aligned on 64 B boundaries, but no additional alignment constraints are placed on send buffer assignments. In one embodiment, the size of the send buffer allocated for a send context has a limit. For example, in one embodiment the size of PIO send memory 120 is 1 MB (1,048,576 Bytes), and the maximum send buffer size is 64 KB (n=1024).

In one embodiment, host processor 104 employs memory paging using 4 KB page granularity. However, send buffer memory mappings into the host virtual address space are not required to be at 4 KB page granularity.

This architectural choice means that the host processor's 4 KB paging mechanism is not sufficient to provide protection between two send contexts when the send buffers are at 64 B granularity. A simple address space remapping is implemented by HFI 102 using a base offset and bound per send context. This is achieved by including the send context number in the physical address used to access the send buffer for a particular context. Thus, the send context number is included in the physical address of the mappings that the driver sets up for a user process. HFI 102 uses this information on writes to the send buffer to identify the send context that is being written, and uses that value to look up information for that send context to validate that the send context has access to that particular send block within the send buffer memory and then remap the address to an index into the send buffer memory. This approach allows the start of each send buffer to be aligned to a 4 KB page in the HFI's address map, yet still share send buffer memory at 64 B granularity.

As discussed above, the minimum amount of send buffer memory per send buffer is 64 B corresponding to one send block (n=1). The maximum amount of send buffer memory per send buffer is 64 KB which is 1024 send blocks. In one embodiment, this limit is placed to limit the amount of physical address map used for addressing by the PIO Send mechanism. Additionally, one more address bit is used to distinguish between send blocks that are the start of a new packet (SOP) versus send blocks that are not the start of a new packet. This encoding allows the packet boundaries to be delineated and provides a sanity check on the correctness of the usage of the PIO Send mechanism. Additionally, the first 8 B in the SOP send block is used to pass Per Buffer Control (PBC) information to HFI 102. The PBC is a 64-bit control quad-word (QW) that is not part of the packet data itself, but contains important control information about the packet. The SOP bit in the address allows the adapter to locate the PBC values in the incoming stream of writes to the send buffer.

Figure 3:
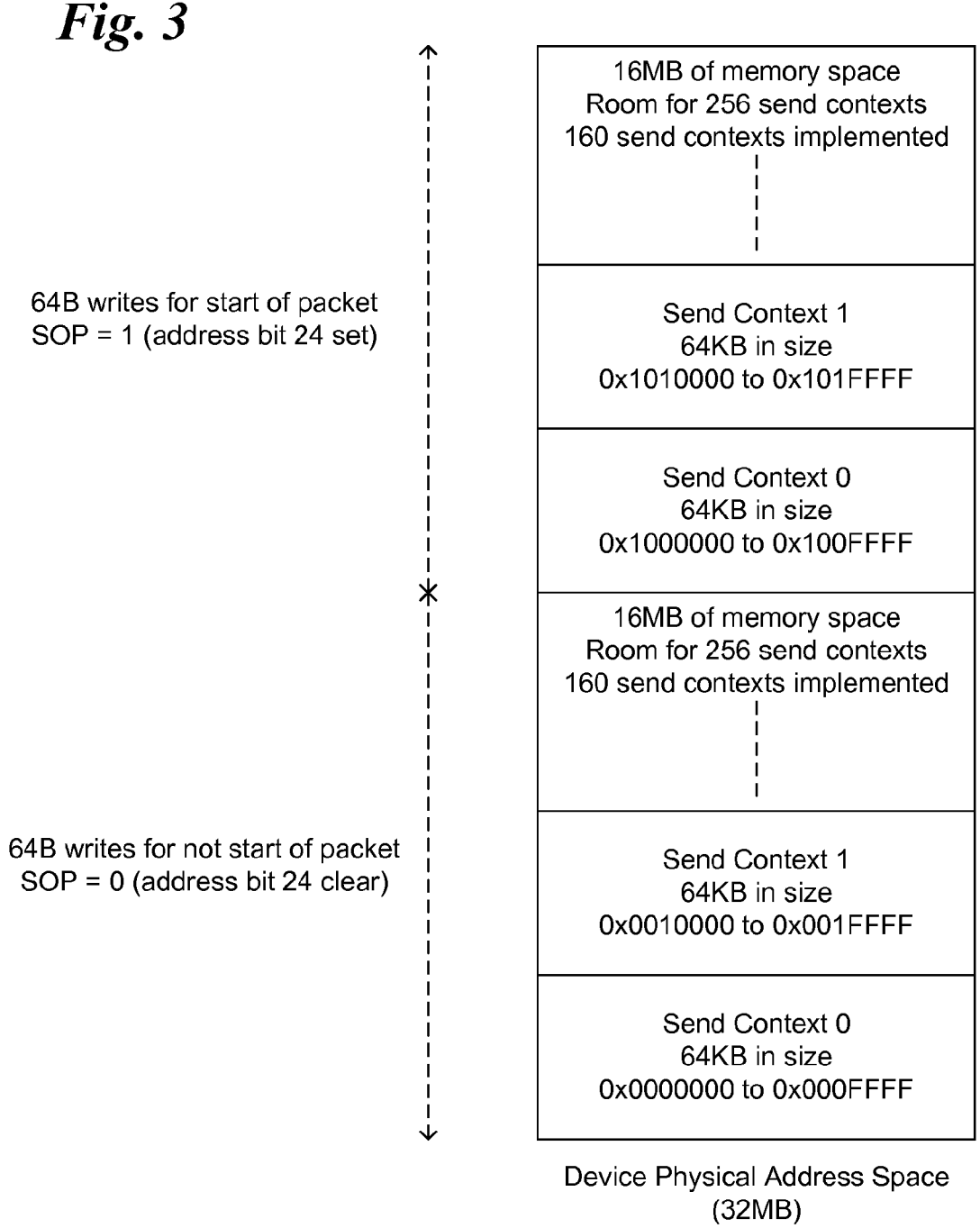
FIG. 3 is a block diagram illustrating an example of PIO Send physical address space.

In one embodiment, the decoding of the PIO Send physical address space is defined in TABLE 1 below and depicted in FIG. 3. In the embodiment illustrated in FIG. 3, the total amount of physical address space occupied by the PIO send buffer memory is 32 MB.

TABLE 1

| Address Bits | Interpretation |
|---|---|
| ADDRESS[24] | 0 = not start of packet, 1 = start of packet (SOP) |
| ADDRESS[23:16] | Send context number (8 bits to address 160 contexts) |
| ADDRESS[15:0] | Byte address within a maximum 64 KB send buffer. The send buffer starts at 0x0000 and extends for a |

Figure 4:
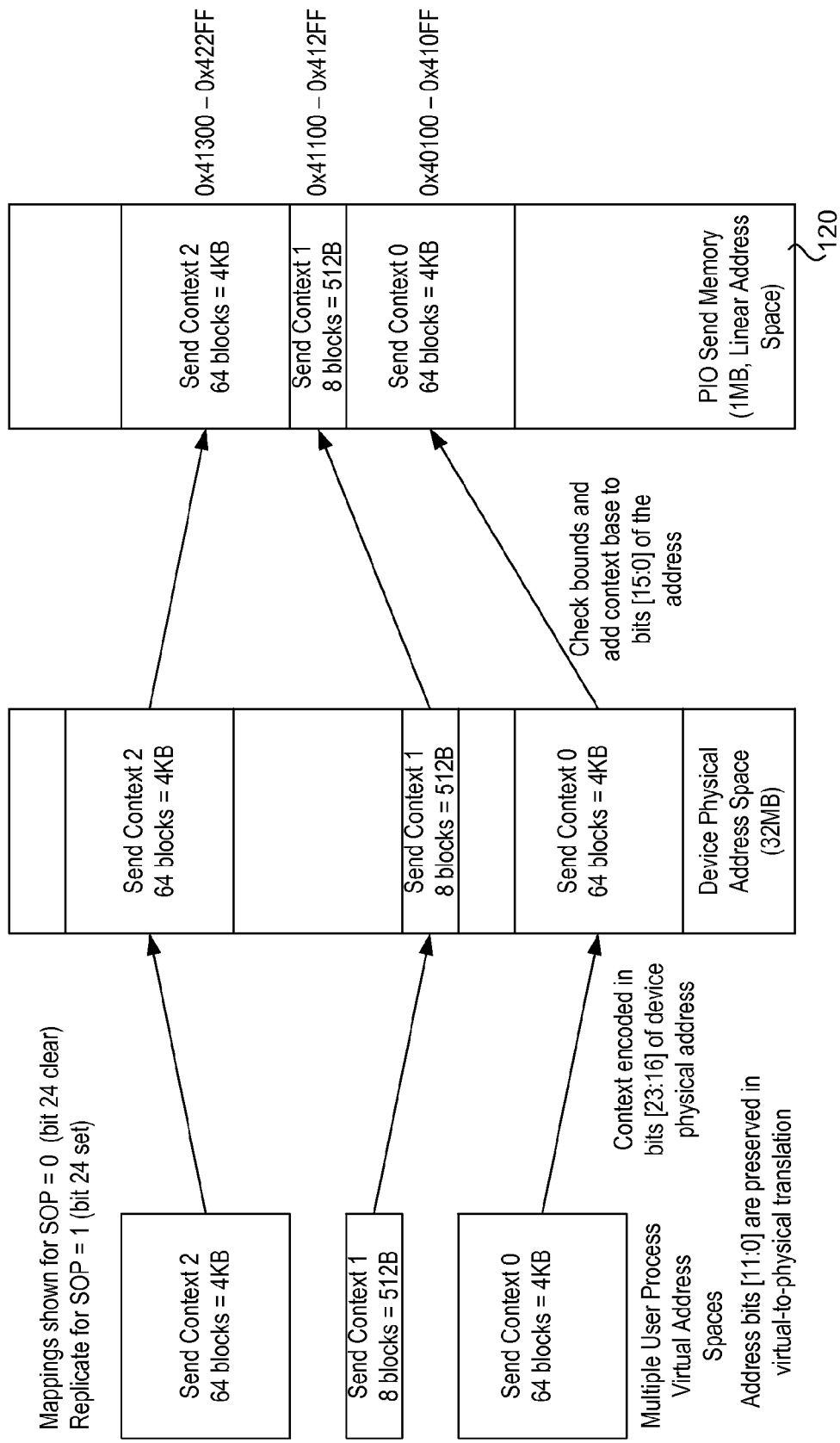
FIG. 4 is a block diagram illustrating exemplary address mappings between a virtual address space, device physical address space, and PIO send memory address space.

Three examples of the address mapping process are illustrated in FIG. 4. Note that the three example contexts are contiguous in the send buffer memory and not on 4 KB page aligned, but are separated in the device physical address space by context number so that they can be mapped into host virtual address space without sharing across send contexts. An extreme example of this would be 64 user processes using 64 different send contexts of one 64 B send block each mapped onto the same 4 KB worth of send buffer memory in PIO send memory 120.

By way of example, consider the address mapping of send context 0. This send context comprises 64 blocks or 4 KB of user process virtual address space. The context is encoded in bits [23:16] of the device physical address space, while virtual address bits [11:0] are preserved in the virtual-to-physical address translation. It is further noted that if the send context corresponds to the start of a new packet, bit 24 is set ('1'), otherwise bit 24 is cleared ('0'). The physical address-to-PIO send memory address mapping adds the context address bits [24:16] to context base bits [15:0] of the address. As further shown, the size of a send context is the same in each of virtual memory, physical memory, and PIO send memory. Similar address mapping is employed for send context 1 and send context 2.

Packet fill for PIO Send uses host processor writes into the send buffer mapped into host address space. The mapping is typically configured as write-combining so that processor writes are not cached and are instead opportunistically aggregated up to the 64 B processor store buffer size before being pushed out as posted write transactions over PCIe to HFI 102.

In one embodiment, the HFI architecture employs PIO Send write transactions at 8 B granularity. Accordingly, each transaction is a multiple of 8 B in size, and start on addresses that are 8 B aligned. In one embodiment, there is a requirement that each write not cross a 64 B boundary to ensure that each write is contained within a 64 B send block. Accordingly, in one embodiment PIO Send employs PCIe writes that are 64 B in size and 64 B aligned.

For best performance, it is recommended that software fills send buffers in ascending address order and optimizes for 64 B transfers. In one embodiment, software employs padding (as applicable) to generate write sequences to multiples of 64 B so that all send blocks used for the PIO Send operation are exactly filled. Thus, from an instruction point of view software should write all of one 64 B send block before starting writes to the next 64 B send block and continuing through to the final 64 B send block. The processor write-combining mechanism can reorder these writes, and therefore the HFI hardware does not rely upon these write sequences arriving in this order over PCIe. The HFI hardware supports arbitrary reordering of the write sequences at the 8 B level. The sfence instruction can be used by software to impose ordering on the write sequences. However, since sfence is an expensive operation, the HFI hardware provides optimizations to eliminate the need for sfences as described below.

Each send context provides a write-only send buffer mapped into host memory. As previously described, the send buffer starts at a 4 KB aligned address, is up to 64 KB in size, and is in units of 64 B send blocks. The PIO Send mechanism proceeds by writing packets into the send buffer in a FIFO order. In one embodiment, each packet is filled by writing an 8 B PBC followed by the header and then the payload in increasing address order. The amount of send buffer occupied by this sequence is rounded up to an integral number of contiguous 64 B send blocks (contiguous modulo fashion around the send buffer memory), and software is configured to pad up its write sequence to exactly fill all of these 64 B send blocks.

The PBC is the first 8 B of the first 64 B send block in each PIO Send. The smallest PIO Send is one send block, while the largest supported packet size requires 162 send blocks corresponding to 128 B+10 KB MTU (Maximum Transfer Unit). Packet sizes on the wire are multiples of 4 B, so flexibility is provided in how the more granular 64 B send blocks are used:

The packet length on the wire in 4 B multiples is specified in the PbcLengthDWs field in the PBC.

The fill size in 64 B multiples is determined by rounding PbcLengthDWs up to a 64 B multiple.

The fill size covers the 8 B PBC plus the packet length plus any required padding to bring the write sequence up to a 64 B multiple. The 64 B padding requirement simplifies the hardware implementation since all send blocks are completely filled. Additionally, this approach improves performance by ensuring that the write-combining store buffer for the last part of a packet to be filled to 64 B causing it to automatically drain to the HFI without using an explicit sfence instruction. The padding bytes do not contribute to the packet that is egressed to the wire.

Figure 5:
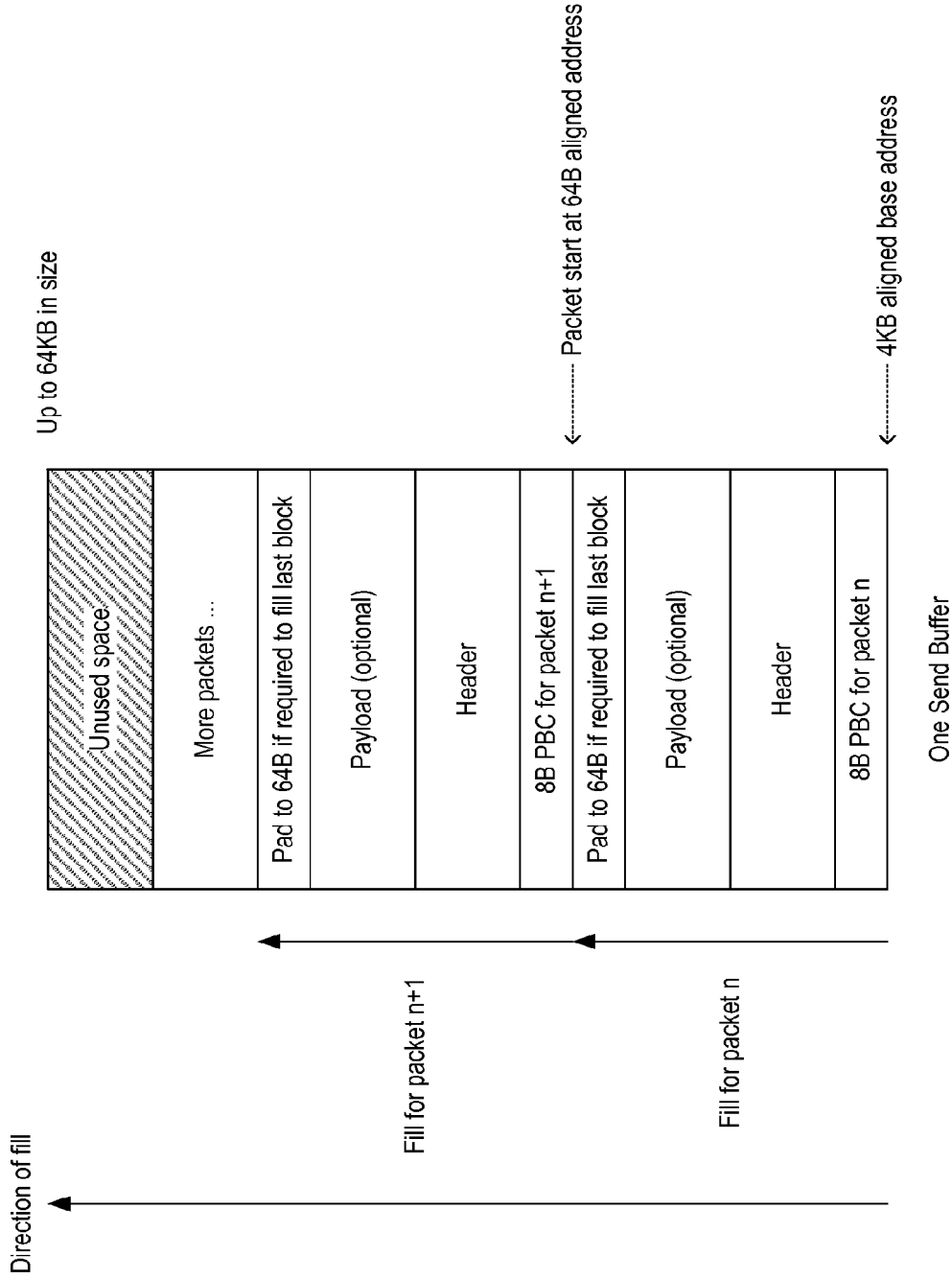
FIG. 5 is a block diagram illustrating a layout of a send buffer, according to one embodiment.

The layout of a send buffer, according to one embodiment, is shown in FIG. 5. The send buffer memory is used with a FIFO-like semantic. The FIFO order is defined by the address order of the send blocks used for each packet in the send buffer mapping. Note that the send buffer is used in a wrap-around fashion (e.g., implemented as a circular FIFO). This means that once software writes the last 64 B in the send buffer, it needs to update the address back to the base of the send buffer. The writes into the send buffer are subject to a credit limit and credit return policy to ensure that the host processor does not over-write send buffer blocks that are still in use from prior packets that have not yet egressed to the fabric. The FIFO-like semantics are:

Packets are filled in FIFO order, though there is a reassembly feature that copes with the reordering of writes inherent in the write-combining implementation.

Packets are subsequently launched in FIFO order. After launch the packets are eligible for VL arbitration.

Packets are subsequently egressed from a per-VL launch FIFO and will be in-order for packets from the same context with the same VL, but may be out-of-order for packets from the same send context on different VLs.

Credit return is in the original FIFO order. This means that the credit for packets that egress out-of-order is not recovered until all earlier packets on that send context are already egressed.

The write-combining mapping allows the host processor to reorder the writes that are used to build the packets. Under the conventional approach, the processor architectural mechanism to impose order is the sfence instruction. This ensures that all writes prior to the sfence instruction will become visible to the HFI prior to all writes after the sfence instruction. However, this ordering comes with a significant cost since it requires a round-trip in the host processor from the CPU core issuing the stores to the ordering point in the integrated Input-Output block (IIO). This adds significant latency, and moreover prevents all other stores from completing in the CPU core until the sfence ordering is acknowledged. The out-of-order capabilities of the CPU allow some forward progress on instructions to cover this latency but these resources can soon run out, and there will be a significant backlog of unretired instructions to recover. The HFI architecture seeks to minimize or eliminate the need for sfence instructions to order the write-combined sequences.

The first optimization is elimination of sfences within a packet. Here the writes that comprise the PIO Send operation for one packet can be reordered by the processor and the HFI reassembles the correct order, and provides a mechanism to detect when all writes have arrived such that the packet fill is complete and the packet can be launched. This optimization gives increasing benefit with the number of send blocks in a packet. The second optimization is elimination of sfences between packets, which requires the HFI to reassemble interleaved writes from different packet PIO Sends into their respective packets. This optimization is very important for short packets, such as the common example of packets that fit into a single 64 B send block. The mechanism provided by the HFI covers both optimizations.

The HFI determines the correct data placement of any PIO Send write by decoding the address. The context is available in higher order address bits, and this determines the send buffer portion that the send context has access to using the base and bounds remap already described. The lowest 16 bits of the address determine the placement of the written data within that send buffer. This approach ensures that writes at 8 B granularity are always correctly reassembled into packet in the send buffer memory regardless of the reordering/splitting/merging of those writes down to 8 B granularity.

Figure 6A:
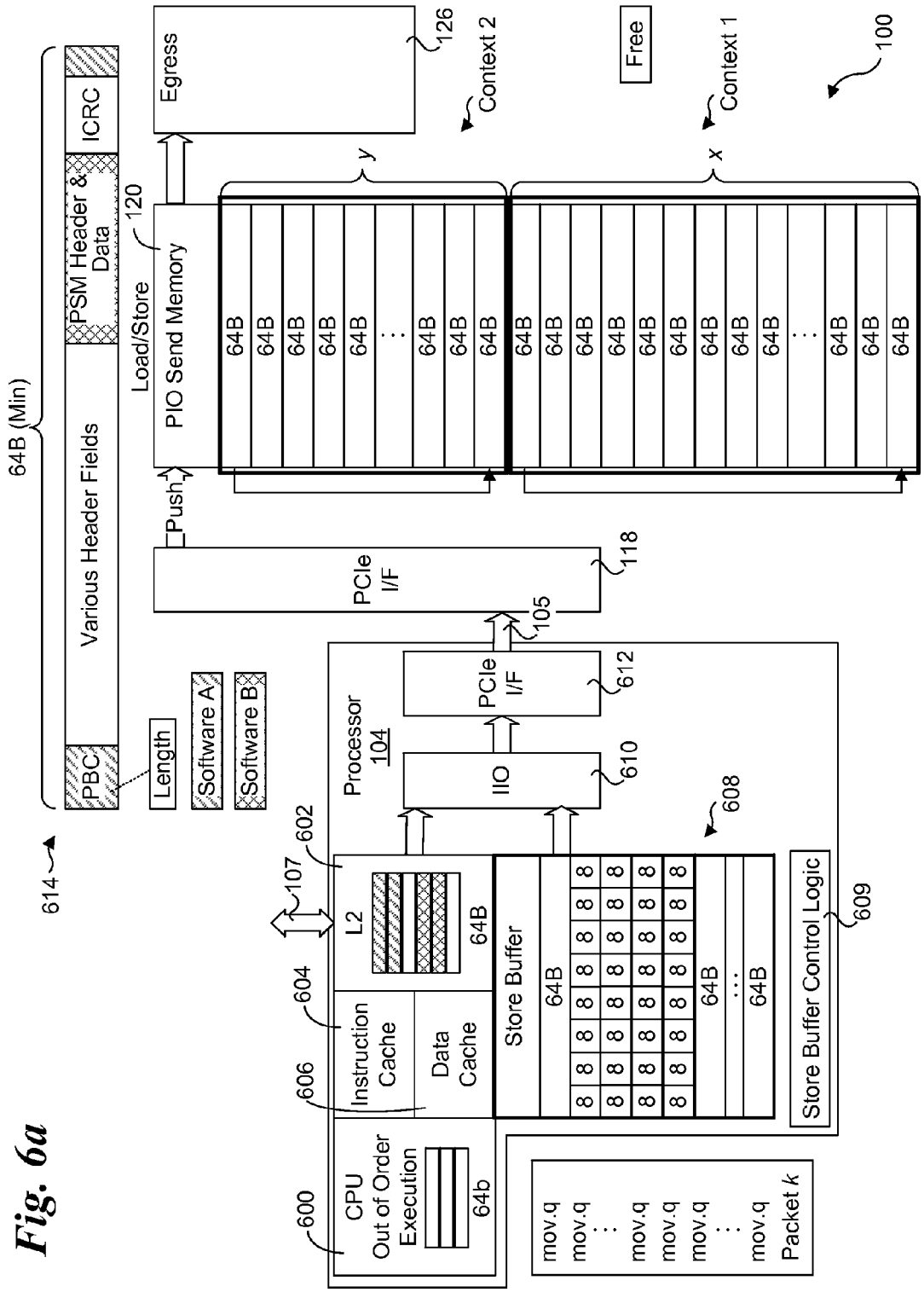
FIG. 6a is a schematic diagram illustrating further details of selective elements of the system of FIG. 1.

FIG. 6*a* shows further details of system 100, according to an embodiment. Processor 104 includes a CPU 600 comprising multiple processor cores that support out of order execution. In one embodiment, each physical processor core may be implemented as two logical cores, such as supported under Intel® Corporations Hyperthreading™ architecture. In one embodiment, processor 104 is a 64-bit processor, with each core including a plurality of 64-bit (64 b) registers. Processor 104 also includes a Level 2 (L2) cache 602 and Level 1 (L1) cache that is split into an instruction cache 604 and a data cache 606 for each core. Although not shown for simplicity, processor 104 may also employ a Last Level Cache (LLC) that is shared across processor cores. Processor 104 further includes a store buffer 608 controlled via store buffer control logic 609, an IIO block 610, and a PCIe interface 612. Further details of one embodiment of the internal structure of processor 104 are shown in FIG. 17 and described below.

In one embodiment, each of memory 106, and L2 cache 602 employ 64-Byte cachelines, while store buffer 608 employs 64-Byte store blocks. As further shown, in one embodiment data is written to store buffer 608 from 64 b registers in CPU 600 in 64-bit (8-Byte) units using a "mov" instruction. For simplicity, the mov instructions are labeled "mov.q" in the Figures herein. Optionally, data may be written to store buffer 608 using store units having other sizes, such as 16 B and 32 B. As described in further detail below, in one embodiment a 512-bit write instruction is used to write 64 B of data to a 64 B store block, wherein each 64 B write fills a store block.

PIO send memory 120 is depicted as including two sends contexts (send context 1 and send context 2); however, it will be recognized that under an actual implementation PIO send memory 120 generally would have many more send contexts (up to 160). Send contexts are allocated to software applications (or otherwise in response to request for an allocation of a send context for usage by a software application). In this example, a software application 'A' is allocated send context 1, while a software application 'B' is allocated send context 2. The size of send contexts 1 and 2 is x and y 64 B send blocks, respectively. Upon an initial allocation of a send context, each of the send blocks in the send context will be empty or "free" (e.g., available for adding data). During ongoing operations, a send context is operated as a circular FIFO, with 64 B send blocks in the FIFO being filled from store buffer 608 and removed from the FIFO as packets are forwarded to egress block 126 (referred to as egressing the send blocks, as described below), freeing the egressed send blocks for reuse. Under the FIFO context, each send block corresponds to a FIFO slot, with the slot at which data is added having a corresponding memory-mapped address in PIO send memory 120.

Each packet 614 includes multiple header fields including a PBC field, various header fields (shown combined for simplicity), a PSM (Performance Scale Messaging) header and PSM data, and an ICRC (Invariant CRC) field. As shown, the minimum size of a packet 614 is 64 B, which matches the store block size in store buffer 608 and matches the 64 B send block size used for each slot in the send context FIFO.

During ongoing operations, software instructions will be executed on cores in CPU 600 to cause copies of packet data in memory 106 to be written to send contexts in PIO send memory 120. First, the packet data along with corresponding instructions will be copied from memory 106 into L2 cache 602, with the instructions and data being copied from L2 cache 602 to instruction cache 604 and data cache 606. Optionally, the packet data and instructions may already reside in L2 cache 602 or in instruction cache 604 and data cache 606. A sequence of mov instructions for writing packet data from registers in CPU 600 to 8 B store units in store buffer 608 are shown in the Figures herein as being grouped in packets; however, it will be recognized that the processor cores continuously are executing instruction threads containing the mov instructions.

Figure 6B:
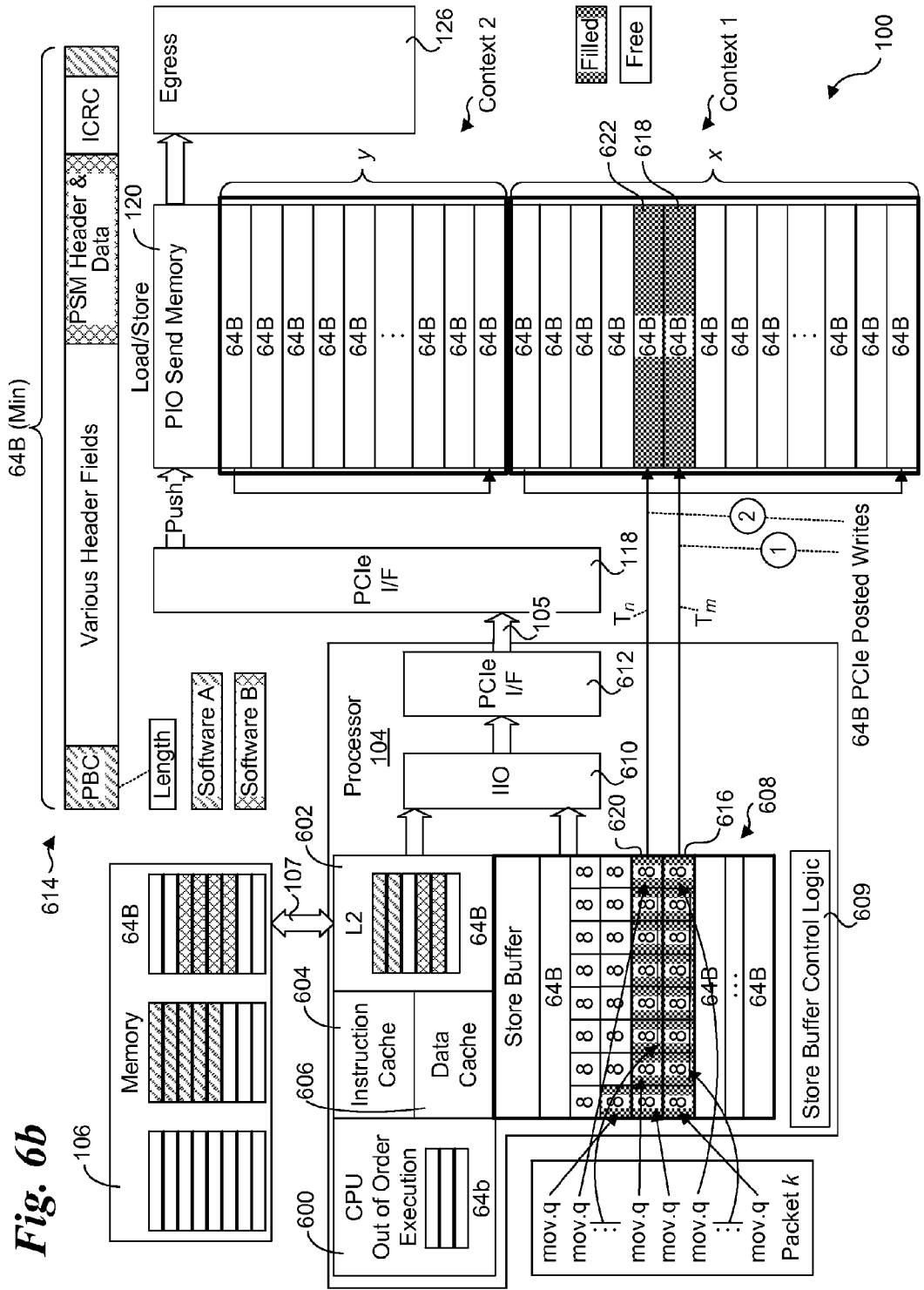
FIG. 6b is a schematic diagram illustrating two blocks of packet data being written to a store buffer, and forwarded to a send buffer in PIO send memory.

As shown in FIG. 6b, as mov instructions for copying (writing) data from processor core registers to 8 B store units in store buffer 608 are processed, 64 B store blocks are filled. In one embodiment, store buffer 608 operates in a random access fashion, under which the addresses of the store blocks are unrelated to the addressing used for storing the data in PIO send memory 120. A store buffer block fill detection mechanism is implemented in store buffer control logic 609 to determine when a given 64 B store block is filled. Upon detection that a store block is filled, the store block is "drained" by performing a 64 B PCIe posted write from store buffer 608 to a 64 B send block at an appropriate FIFO slot in PIO send memory 120. The term "drained" is used herein to convey that the 64 B PCIe posted write is generated by hardware (e.g., store buffer control logic 609), as opposed to "flushing" a buffer, which is generally implemented via a software instruction. As illustrated in FIG. 6b, at a time $T_m$, a store block 616 is detected as being full, resulting in store block 616 being drained via a 64 B PCIe posted write to a send block 618 in the send buffer in PIO send memory 120 allocated for send context 1. Similarly, at a subsequent time $T_n$, a store block 620 in store buffer 608 is detected as filled, resulting in store block 620 being drained via a second 64 B PCIe posted write to a send block 622 in PIO send memory 120. The use of the encircled '1' and '2' are to indicate the order in which the PCIe posted writes occur in FIG. 6b and other Figures herein. In conjunction with draining a 64 B store block, its storage space is freed for reuse. In one embodiment, store buffer 608 includes store block usage information that is made visible to the processor (or processor core) to enable the processor/core to identify free store blocks (eight sequential 8 B blocks on 64 B boundaries) that are available for writes. Additionally, in examples in the Figures herein store blocks may be depicted as being filled in a sequential order. However, this is to simplify representation of how data is moved, as a store buffer may operate using random access under which the particular store block used to store data is unrelated to the PIO send memory address to which the data is to be written.

FIGS. 7a-7f illustrate an exemplary time-lapse sequence illustrating how packet data is added to PIO send memory 120 and subsequently egressed using 8 B writes to 8 B store units. Each of FIGS. 7a-7f depict further details of store buffer 608 and PIO send buffer 120. As described above, the memory space of a PIO send buffer may be partitioned into buffers for up to 160 send contexts. Each of FIGS. 7a-7f depicts a send context 3 and send context 4 in addition to send contexts 1 and 2, which are also shown in FIGS. 6a and 6b and discussed above. Send context 3 and 4 are illustrative of additional send contexts that share the buffer space of PIO send buffer 120. In addition, send contexts 3 and 4 are depicted with a different crosshatch pattern to indicate these send contexts are being used by software running on another processor core. Generally, in a multi-core CPU, instruction threads corresponding to various tasks and services are assigned to and distributed among the processor cores. Under one embodiment, PIO send buffer 120 is shared among software applications that include components, modules, etc., comprising a portion of these instruction threads. These instruction threads are executed asynchronously relative to instruction threads executing on other cores, and thus multiple software applications may be concurrently implemented for generating packet data that is asynchronously being added to send contexts in the PIO send buffer on a per-core basis. Accordingly, while each core can only execute a single instruction at a time, such as a mov, multiple instructions threads are being executed concurrently, resulting in similar data transfers to those illustrated in FIGS. 7a-7f being employed for other send contexts, such as send contexts 3 and 4 as well as send contexts that are not shown. To support these concurrent and asynchronous data transfers, a store buffer may be configured to be shared among multiple cores, or a private store buffer may be allocated for each core, depending on the particular processor architecture.

Figure 7A:
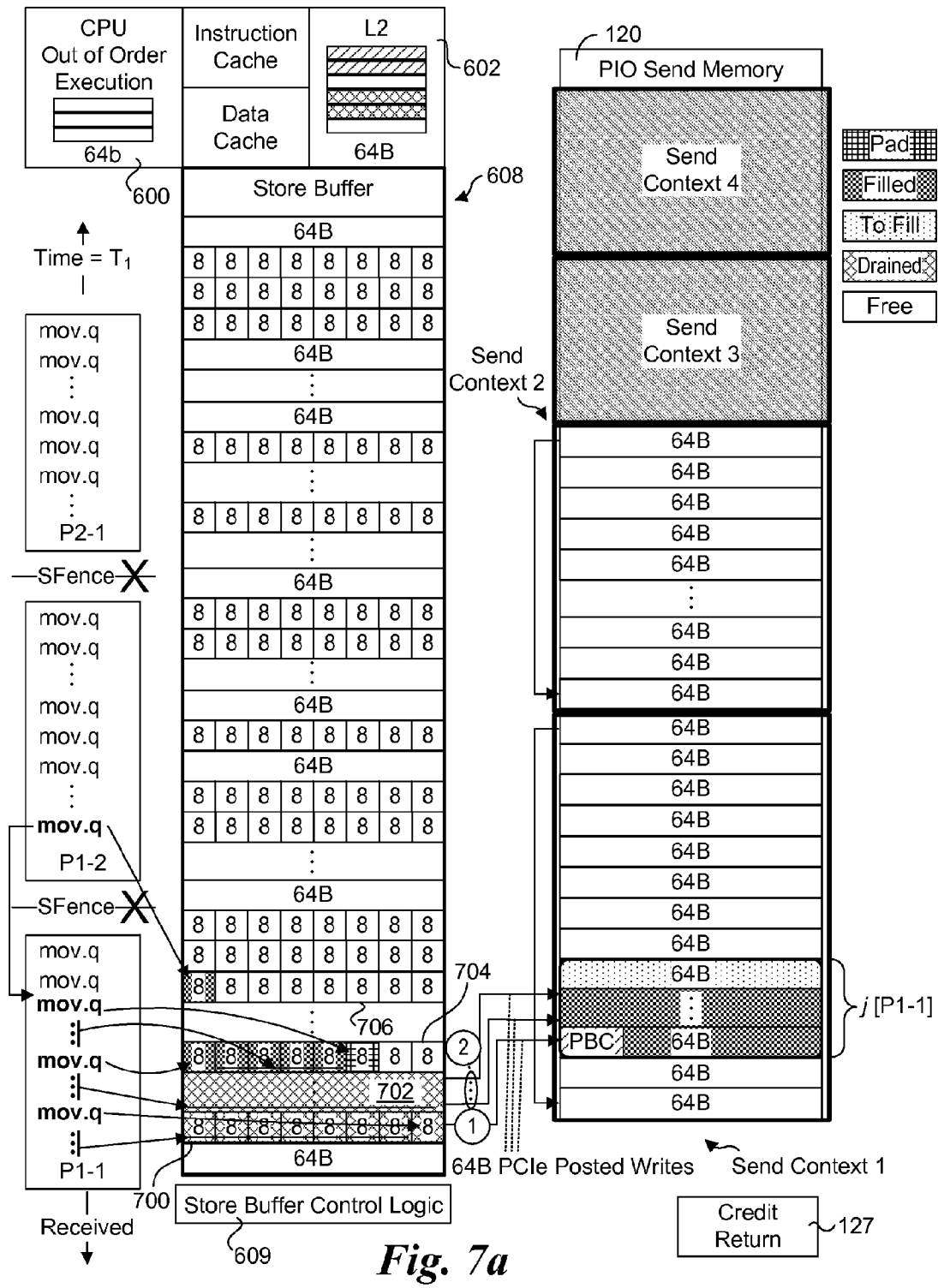
FIGS. 7a-7f are schematic diagrams illustrating send timeframes corresponding to an exemplary transfer of packet data from memory to PIO send memory through packet egress.

FIG. 7a corresponds to a first timeframe $T_1$ under which data has been added to all eight 8 B store units corresponding to a first 64 B store block 700, which results in the 64 Bytes of data being written to a send block at the third FIFO slot in send context 1. The send block to which the data will be written will be based on the memory mapped address of that send block that is based on the PIO write instruction and the virtual-to-physical-to-PIO send memory address translation, such as illustrated in FIG. 4 and discussed above. This send block corresponds to a first block in a packet that has a fill size that is j blocks long (including padding, as applicable). As discussed above, the PBC header includes a PbcLengthDWs field that specifies the packet length in 4 B multiples. The amount of space occupied by a packet in a send context (the packet's fill size) comprises n 64 B send blocks (and thus n FIFO slots), wherein n is determined by rounding the PbcLengthDWs field value up to the next 64 B multiple. In the example illustrated in FIG. 7a, j=n, as determined from the PbcLengthDWs field value.

In connection with determining the fill size of a packet, control information is generated to identify the last send block to which packet data is to be added to complete transfer of the entirety of the packet's data (full packet) into the send context in PIO send memory 120; in the Figures herein send blocks that are identified as being used to store a portion of packet data that is yet to be received is marked "To Fill" (meaning to be filled). Under the store and forward implementation, data for a packet cannot be forwarded to egress block 126 until the entire packet content is stored in PIO send memory 120. The PIO send block egress control information is used by a full packet detection mechanism implemented in logic in the transmit engine (not shown) that detects when an entirety of a packet's content (including any applicable padding to fill out the last send block) has been written to PIO send memory 120. In one embodiment, this full packet detection mechanism tracks when send blocks in corresponding FIFO slots are filled, and the control information comprises the address of the start and end FIFO slot for each packet (or an abstraction thereof, such as a send block number or FIFO slot number). Generally, the address may be relative to the base address of PIO send memory 120, or relative to the base address of the send context associated with the FIFO buffer.

In FIGS. 7a-7f, the mov instructions for respective packets are shown as being grouped by packet, using a labeling scheme of Pa-b, where a corresponds to the send context and b corresponds to an original order of the packets are added to the send context. The use of this labeling scheme is for illustrative purposes to better explain how packet data is written to a send context; it will be understood that the actual locations at which data are written to PIO send buffer 120 will be based on the PIO write instruction in combination with the address translation scheme, as discussed above.

Figure 9A:
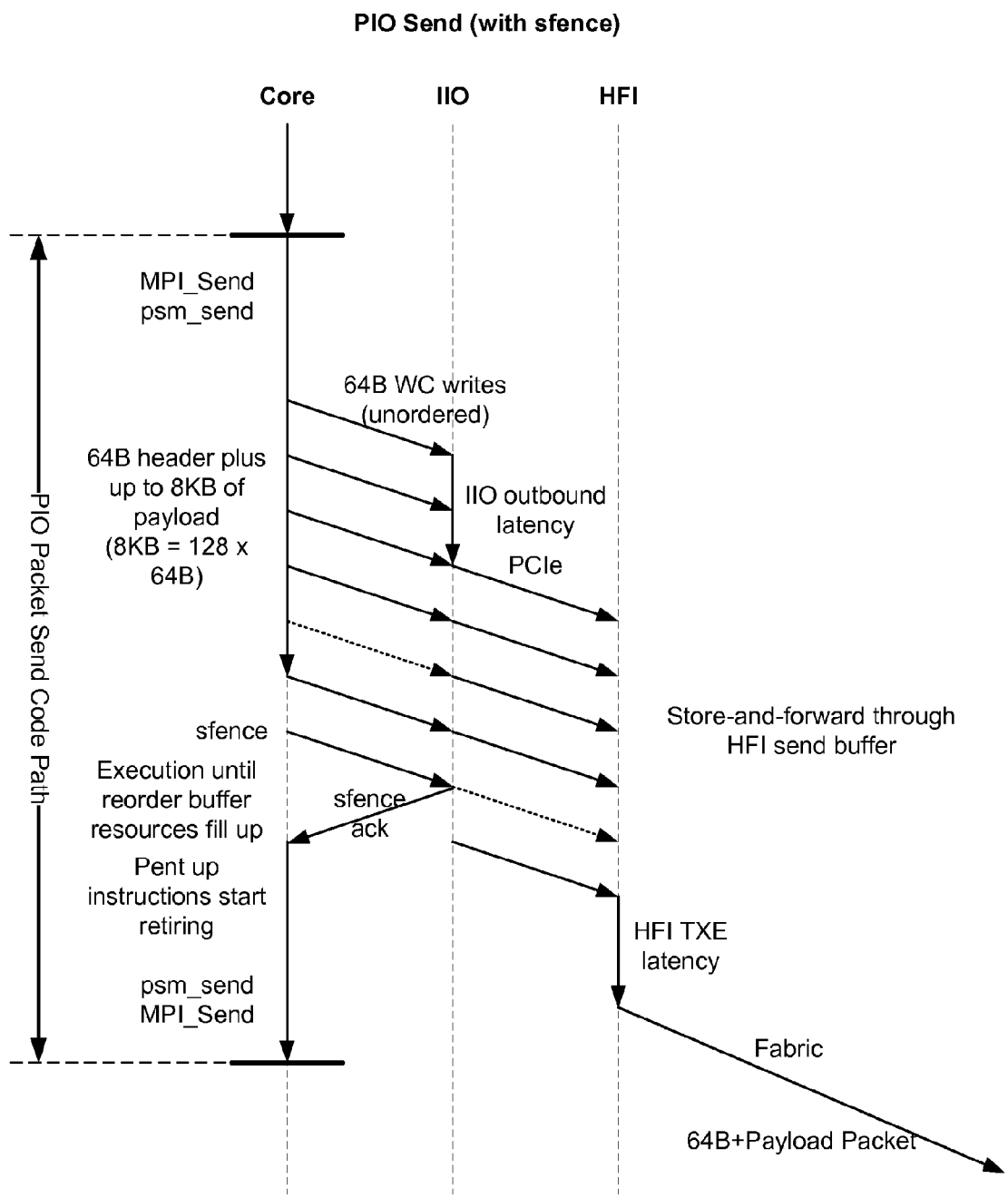
FIGS. 9a and 9b are timeflow diagrams illustrating a comparison of data transfer latencies for PIO send writes with and without sfences, respectively.
Figure 9B:
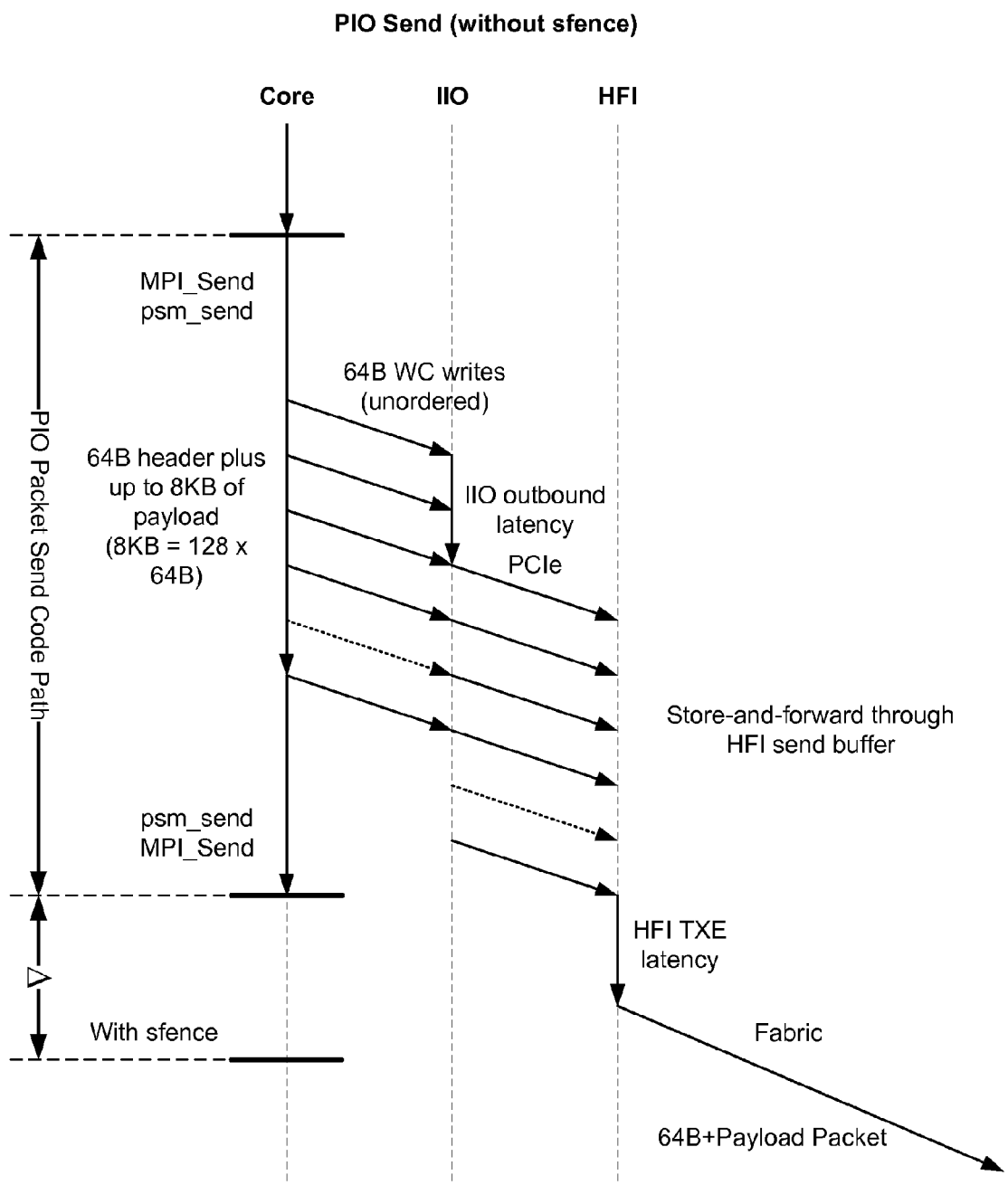

Although the mov instructions are depicted as being processed on a packet-by-packet basis, the order of these instructions corresponds to the order the mov instructions arrive at the core's execution pipeline. However, processors that support out of order execution may execute instructions in a different order than the order in which the instructions arrive. Under some conventional approaches, out of order execution is permitted for mov instructions within a packet, but not across packets. This is facilitated through use of an SFENCE or sfence (Store Fence, also depicted in the Figures as SFence) instruction under which all storage (e.g., mov in this example) instructions prior to an SFENCE instruction are globally visible before any storage instructions after the SFENCE instruction. As a result, under the conventional approach packet data referenced in mov instructions following an SFENCE cannot be written to the store buffer until all of the data for a proceeding packet has been written to the store buffer. In order to enforce this logic, the execution of instructions may be stalled, resulting in a reduction in packet forwarding performance. In addition, SFENCE instructions may be used to enforce write ordering within packets in a similar manner. Illustrations comparing PIO writes with and without sfences are shown in FIGS. 9a and 9b, as discussed below.

Figure 7B:
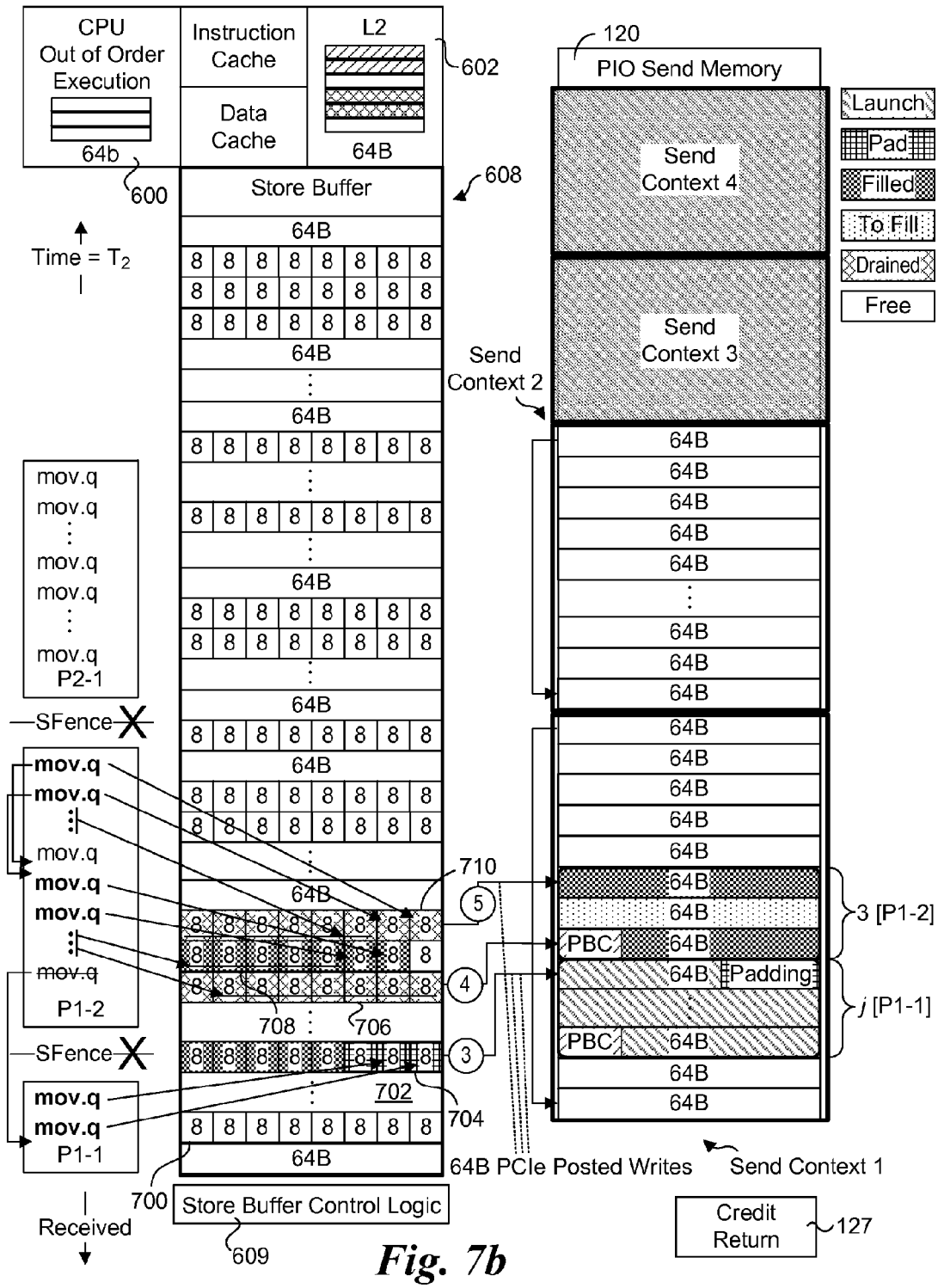

In accordance with aspects of embodiments disclosed herein, the conventional use of SFENCE instructions is removed, enabling storage instructions from separate packets to be executed out of order, such that storage for a second packet in the store buffer may begin prior to completion of storage for a prior (in the received instruction order) first packet. An example of this is depicted in FIG. 7a, wherein the first "mov.q" instruction for packet P1-2 is executed out of order and prior to the last two "mov.q" instructions for packet P1-1, resulting in data for a first 8 B store unit in a store block 706 being written to store buffer 608. At the conclusion of the first timeframe, packet data has been written to send context 1 for the first j−1 send blocks (as shown by store block 700 and store blocks 702 for packet P1-1) using j−1 64 B PCIe posted writes. As noted above, in conjunction with each 64 B PCIe posted write, the corresponding block in store buffer 608 being drained is freed; this freed state is shown in FIG. 7b, which depicts a second timeframe $T_2$. In the Figures herein, the order of the 64 B PCIe posted writes are depicted as an encircled number. For convenience, data transfer of a group of 64 B PCIe posted writes are depicted by a single encircled number, such as number '2' in FIG. 7a.

Figure 10:
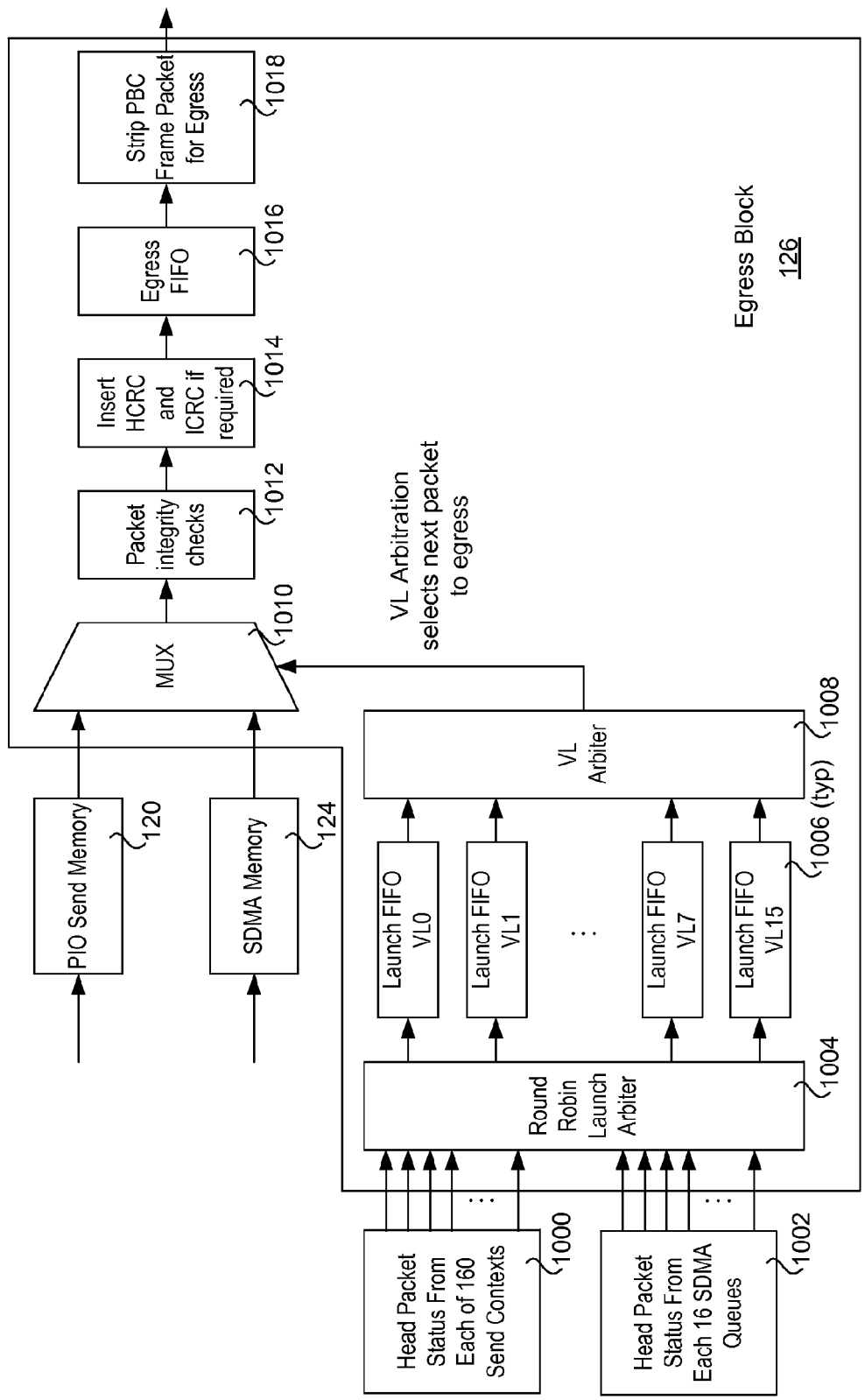
FIG. 10 is a schematic diagram of an egress block, according to one embodiment.
Figure 11:
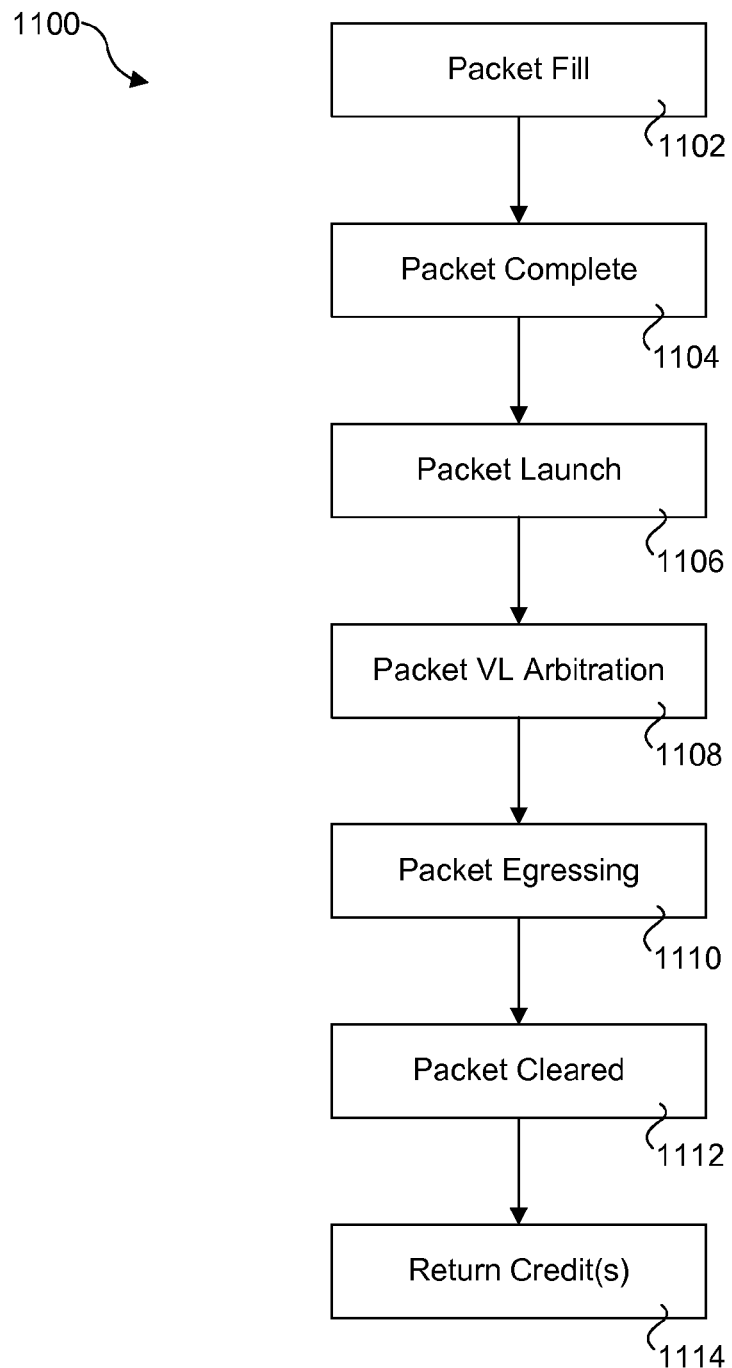
FIG. 11 is a flowchart illustrating operations, phases, and states that are implemented in preparing packet data for egress outbound on a fabric link coupled to an HFI.

During this second timeframe, data corresponding to the two remaining store units for store block 704 (which comprise padding in this example) are added for packet P1-1, and data from store block 704 is written to send context 1 via a 64 B PCIe posted write, which completes writing the full packet data to PIO send memory. This results in a packet complete state, at which point the packet is ready for packet launch arbitration as illustrated in FIGS. 10 and 11 and described in further detail below. In addition, during timeframe $T_2$ data is written to each of store blocks 706, 708, and 710, filling out store blocks 706 and 708, while the mov instruction for filling the last store unit of store block 708 is temporarily skipped via out of order execution, as shown. As illustrated, the PbcLengthDWs value in the PBC header indicates the packet fill size will be three 64 B send blocks. Upon filling each of store blocks 706 and 710, these store blocks are drained and corresponding data is written to send context 1 in PIO send memory 120 via 64 B PCIe posted writes, resulting in the last 64 B block of packet P1-2 being written prior to the middle send block.

Figure 7C:
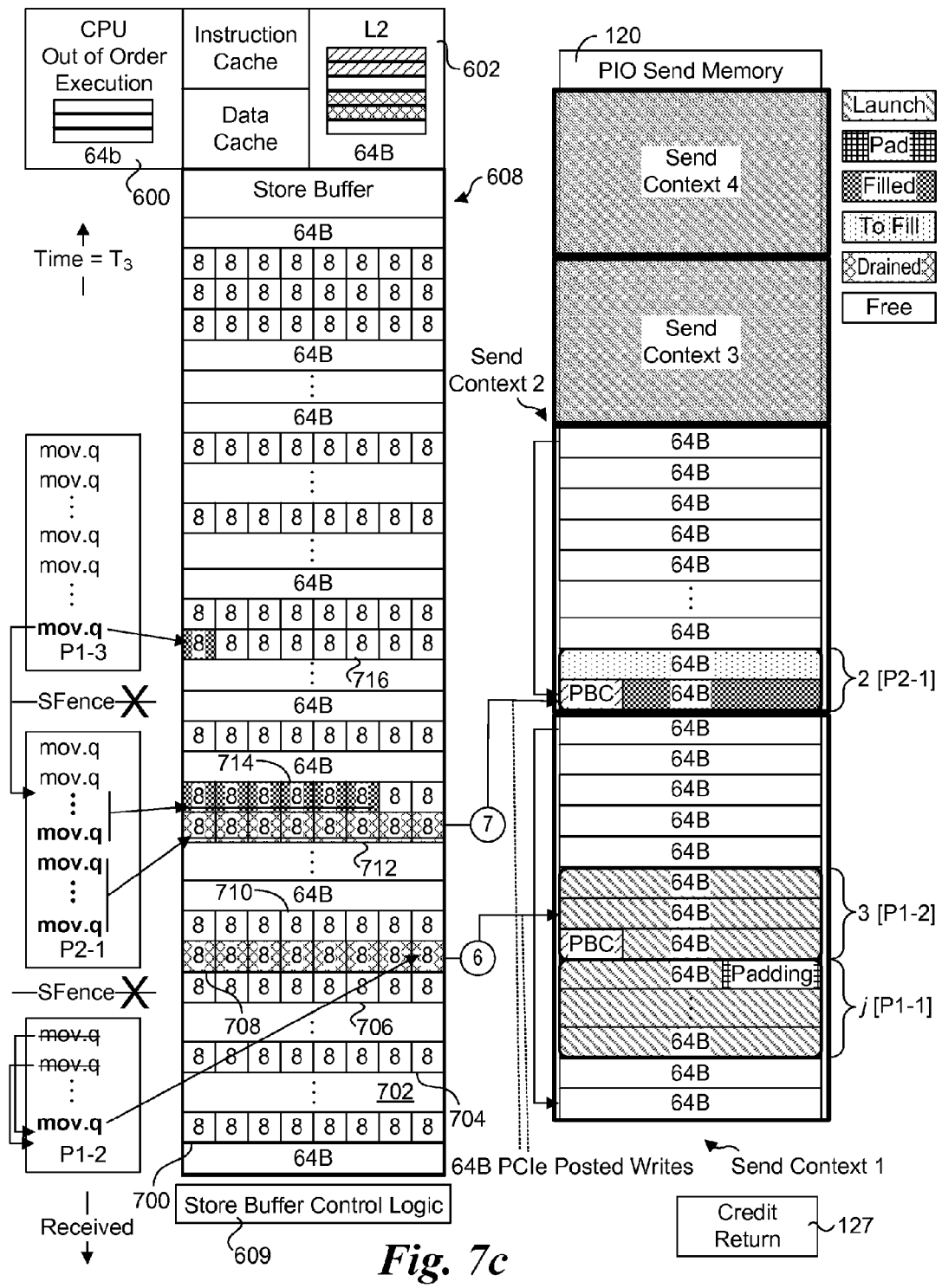

To reduce clutter, some of arrows showing the result of each mov instruction or set of mov instructions are not included in FIGS. 7c-7f; rather, the included arrows may only show a first write to a new store buffer block and a last block being written. As shown in FIG. 7c, during a third timeframe $T_3$ the remaining data for packet P1-2 is written to store block 708, resulting in this store block data being drained and written to the middle send block of packet P1-2 in PIO send memory 120. This completes transfer of packet P1-2 to the PIO send memory, and thus packet P1-2 is ready for launch arbitration. In addition, data corresponding to a first packet to be added to send context 2 (packet P2-1, having a fill size and length of two 64 B send blocks) begins to be written to store blocks 712 and 714, while data for a third packet P1-3 for send context 1 begins to be written using out of order execution to a store block 716.

Figure 7D:
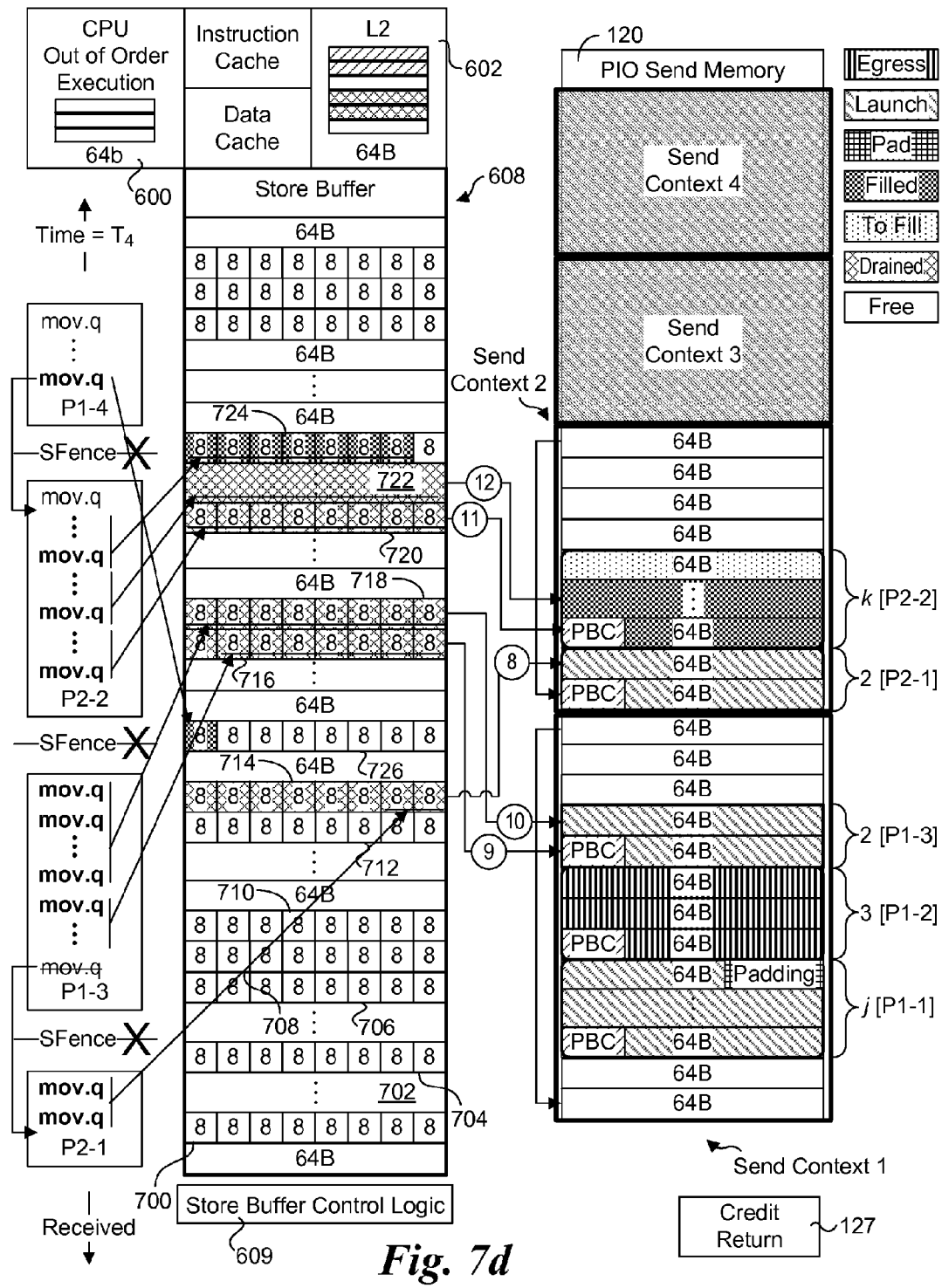

FIG. 7d shows the state of the data transfers during a timeframe $T_4$. During this timeframe the last 16 Bytes of packet P2-1 are written to store buffer 608, causing store block 714 to drain via a 64 B PCIe posted write, which fills the second send block of packet P2-1 in PIO send memory 120, making packet P2-1 available for launch arbitration. Packet P1-3 data is added to fill both of store blocks 716 and 718, draining both store blocks via two 64 B PCIe posted writes to packet P1-3 data in PIO send memory 120, also making packet P1-3 available for launch arbitration. mov instructions for two additional packets P2-2 and P1-4 have also been added in timeframe $T_4$. Packet P2-2 is the second packet to be added to send context 2 and has a size of k 64 B blocks and doesn't need any padding. Packet P1-4 is the fourth packet added to send context 1 and will have the minimum size of 64 B. As illustrated by store blocks 720 and 722, the first k−1 store blocks of packet P2-2 have been added to store buffer 608 and written via k−1 64 B PCIe posted writes to PIO send memory 120. All but the last 8 Bytes of packet P2-2 have been added to a store block 724. Prior to the these last 8 Bytes being written to the last 8 B store unit of store block 724, an out of order mov instruction for writing the first 8 Bytes of packet P1-4 is executed, which begins to fill a store block 726. Lastly, packet P1-2 has been selected for egress by the VL arbiter, and its data is being egressed for its send blocks in FIFO order. This illustrates an example under which a packet whose data is added after packet data for a previous packet in the send buffer for the same send context may be selected for egress prior to the previous packet, and thus egressed out of the order in which the packet was filled in the send context.

Figure 7E:
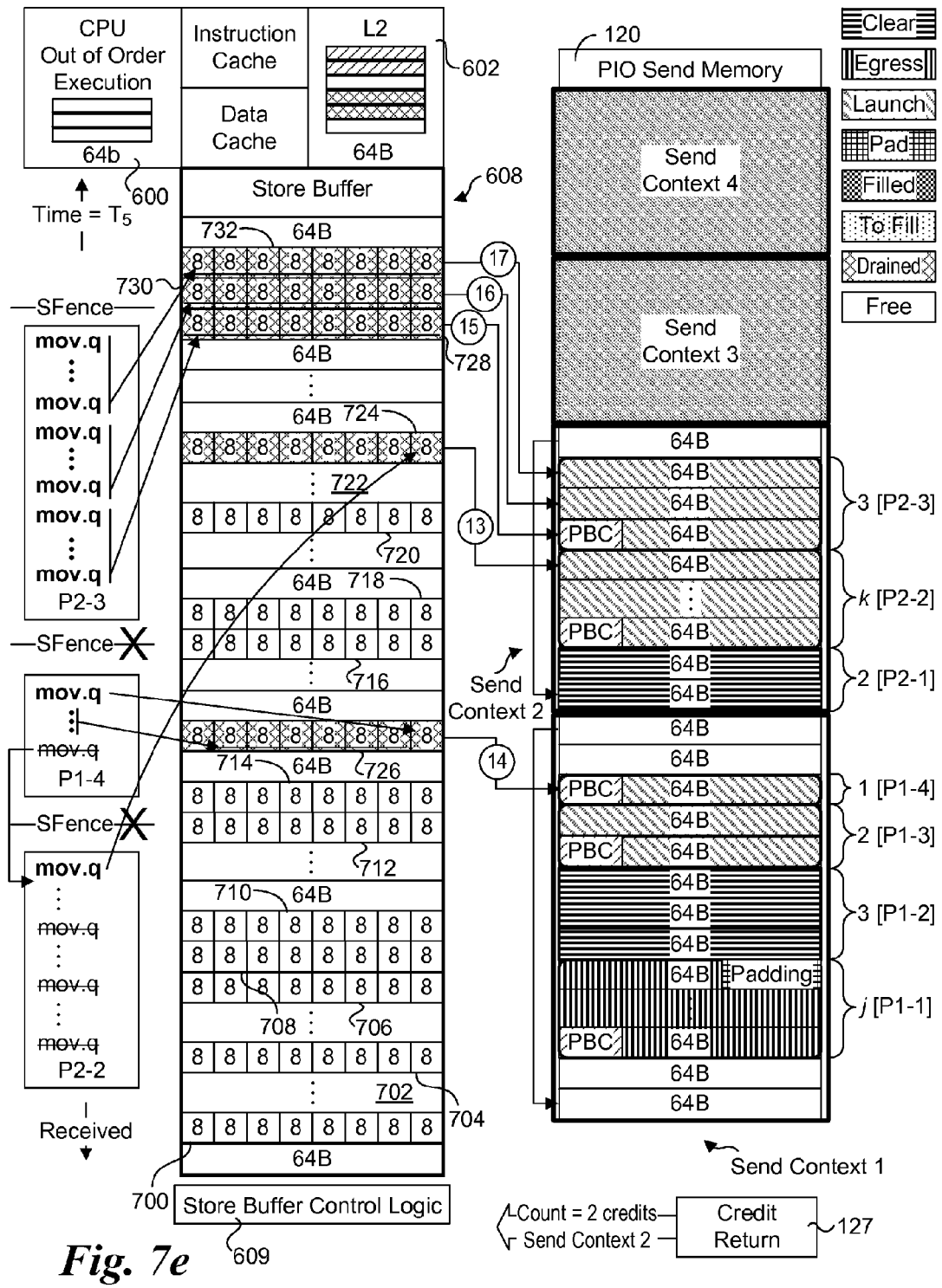

FIG. 7e shows the state of the transfer during a timeframe $T_5$. The last 8 Bytes of packet P2-2 are written to store block 724, and this store block is drained via a 64 B PCIe posted write to the last send block for packet P2-2 in PIO send memory 120, thus completing writing of packet P2-2 data and making packet P2-2 available for launch arbitration. The remaining 56 Bytes of packet P1-4 are written to store block 726 in store buffer 608, followed by writing the store block data via a 64 B PCIe posted write to PIO send memory 120. Upon receipt, the PCB PbcLengthDWs field is inspected and it is determined that this packet has a length of one 64 B send block; since the entirety of the data for packet P1-4 is contained in this block, packet P1-4 is also marked as filled and ready for launch arbitration.

The last packet to be added in this example is packet P2-3, which has a length of 192 B (3×64 B) and doesn't need any padding. This transfer is effected by first writing the 192 B of packet data to three store blocks 728, 730, and 732 in store buffer 608. Upon completion of the 8 mov instructions for each store block, the store block is drained in conjunction with a 64 B PCIe posted write into a respective send blocks allocated for packet P2-3 in send context 2 of PIO send memory 120. Upon completing the last 64 B PCIe posted write, the packet write completion mechanism detects the entirety of packet P2-3 has been written to PIO send memory 120, and thus packet P2-3 is also marked filled complete and available for launch arbitration. Also, packet P1-1 has been selected by the VL arbiter for egress and its send blocks are egressed in FIFO order.

In the illustrated embodiment, an SFENCE instruction is added following the last mov.q instruction for packet P2-3. This is to ensure that all of the data for packet P2-3 is written to store blocks 728, 730, and 732 before any of them are flushed. If write instructions for subsequent packets immediate follow in the instruction thread then the use of an SFENCE instruction is not needed, as the instructions should fill each applicable store block, resulting in the store block being drained before it would be flushed.

In addition to the foregoing, during timeframe $T_5$ each of Packet P1-2 and packet P2-1 have been fully egressed and their corresponding send blocks have been cleared (noting during an early portion of timeframe $T_5$ packet P2-1 was also selected for egress). As described below with reference to FIGS. 11 and 14, when a send block state is cleared, a credit for the send context corresponding to the cleared send block will be returned if there are no send blocks occupying a lower FIFO slot that have not reached the cleared state. In this example, this condition is true for send context 2, but it is not true for send context 1 since packet P1-1 is still egressing and has not reached the cleared state. As a result, two credits are returned for send context 2, while no credits are returned for send context 1 at this point. As detailed below, in one embodiment an absolute credit value comprising an 11-bit running count is returned; in the example of FIG. 7e it is presumed that the running count for send context 2 was at 0 before packet P2-1 had cleared, and thus the running count absolute credit value that is returned is 2.

Figure 7F:
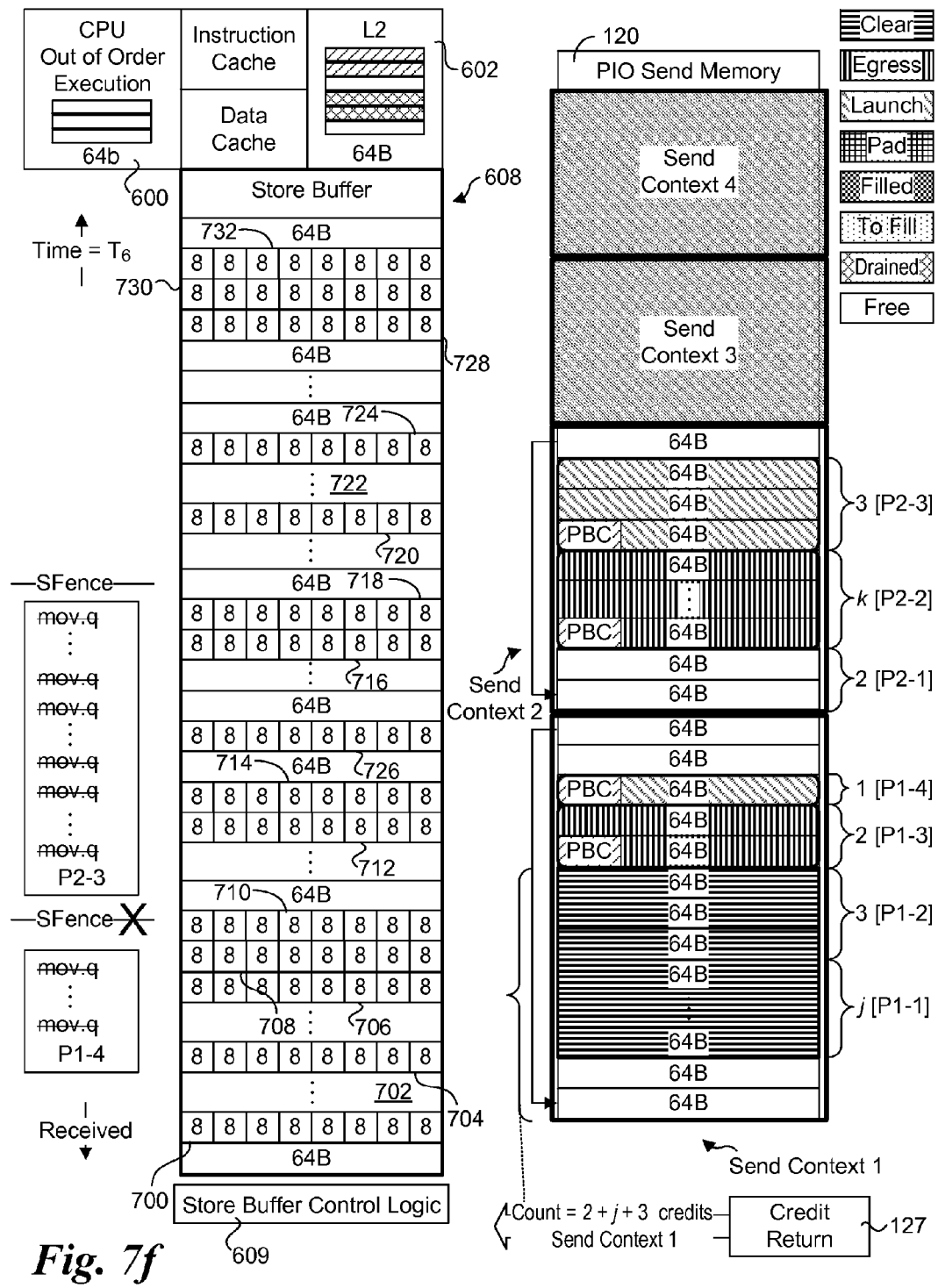

FIG. 7f shows the state of the transfer during a timeframe $T_6$. During this timeframe, packets P1-3 and P2-2 begins to egress, while packet P1-1 completes egress and its send blocks are cleared. At this point, credits for both packets P1-1 and P1-2 are returned for send context 1, totaling j+3 credits, wherein the running counter value will have increased by j+3 relative to the last time credit was returned for send context 1. In the illustrated example, the prior running count was 2 (corresponding to the first two empty FIFO slots for send context 1, and thus the running count absolute credit value returned is 2+j+3. Additionally, the two credits for the send blocks for packet P2-1 sent during timeframe $T_5$ have been received and processed, and the corresponding FIFO slots are marked as free.

According to one embodiment, PIO write instructions may be employed to write 512-bits (64 B) at a time to store buffer 608 such that a single PIO write instruction will result in the complete filling of a store block. In one embodiment this is facilitated through use of a 512 b write instruction, which is supported by Intel® Corporation's Advanced Vector Extension 512 (Intel® AVX-512). Intel AVX-512 features 32 vector registers that are 512 bits wide, enabling 512 bits of data to be moved from these registers into store block 608. It is noted that the use of Intel AVX-512 is merely exemplary and is not to be limiting as other existing and future processors that support 512-bit writes may be used.

FIGS. 8a-e illustrate an exemplary time-lapse sequence illustrating how packet data is added to PIO send memory 120 and subsequently egressed using 512-bit writes to store blocks. In this example, the sequence of write instructions for each packet are depicted as mov512.q instructions to indicate 512-bits of data is being moved from a 512 b register in a CPU 600a. As 512 b movs are being performed, the number of instructions is significantly less than using 8 B movs. As before, SFENCEs are depicted with an "X" to indicate this is where SFENCE instructions would be placed under a conventional approach.

Figure 8A:
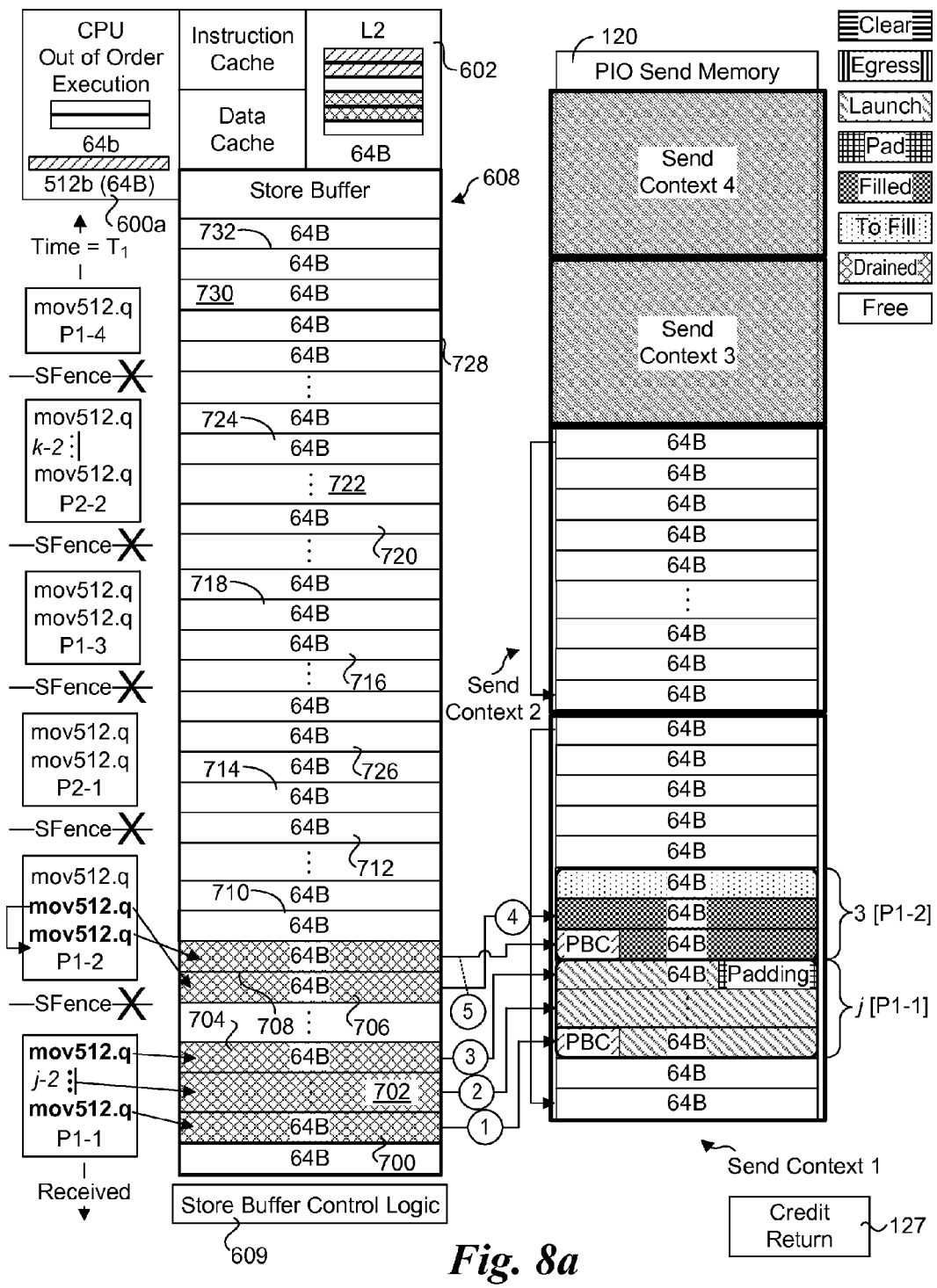
FIGS. 8a-8e are schematic diagrams illustrating send timeframes corresponding to an exemplary transfer of packet data from memory to PIO send memory through packet egress using 512-bit write instructions.

In FIG. 8a, operations performed during a timeframe $T_1$ are illustrated. In addition, mov512.q instructions for a sequence of packets P1-1, P1-2, P2-1, P1-3, P2-2, and P1-4 are depicted as being received; however this is to illustrate the stream of instructions, as some of these instructions will not have been received during timeframe $T_1$, but rather are received during later timeframes proximate to when data is depicted as being written to store buffer 608. For illustrative and comparative purpose, the same packet sequence is depicted in FIGS. 7a-7f and FIGS. 8a-8e, although the order in which some of the send blocks are written to differ between these two examples.

During timeframe $T_1$, j mov512.q instructions for packet P1-1 are executed by a processor core on CPU 600a, resulting for each instruction is 64 B of data being written to a storage block, which is then drained via a 64 B PCIe posted write in a manner similar to that shown in FIGS. 6b and 7a-7f This results in the full packet data for packet P1-1 being written to PIO send memory 120, and the head packet status for this packet is marked for launch arbitration. In addition, the first two mov512.q instructions for packet P1-2 are received but executed out of order. As a result, the middle send block in which the packet data is written will be written to PIO send memory prior to the first send block, as depicted by 64 B PCIe posted writes '4' and '5'. Upon receipt of the data for the middle send block, the control information employed by transmit engine logic will not know the number of blocks needed to be filled for packet P1-2, since the head packet (and thus PBC header) has yet to be received. The receipt of a head packet can be detected in one of two ways, either via inspection of the first portion of the send block to detect the PBC header or via a Start of Packet (SOP) bit in the 64 B PCIe posted write indicating the write contains the first send block for a packet. Upon receipt of the first send block for packet P1-2, its PBC header is inspected and it is determined this packet's fill size is three send blocks.

Figure 8B:
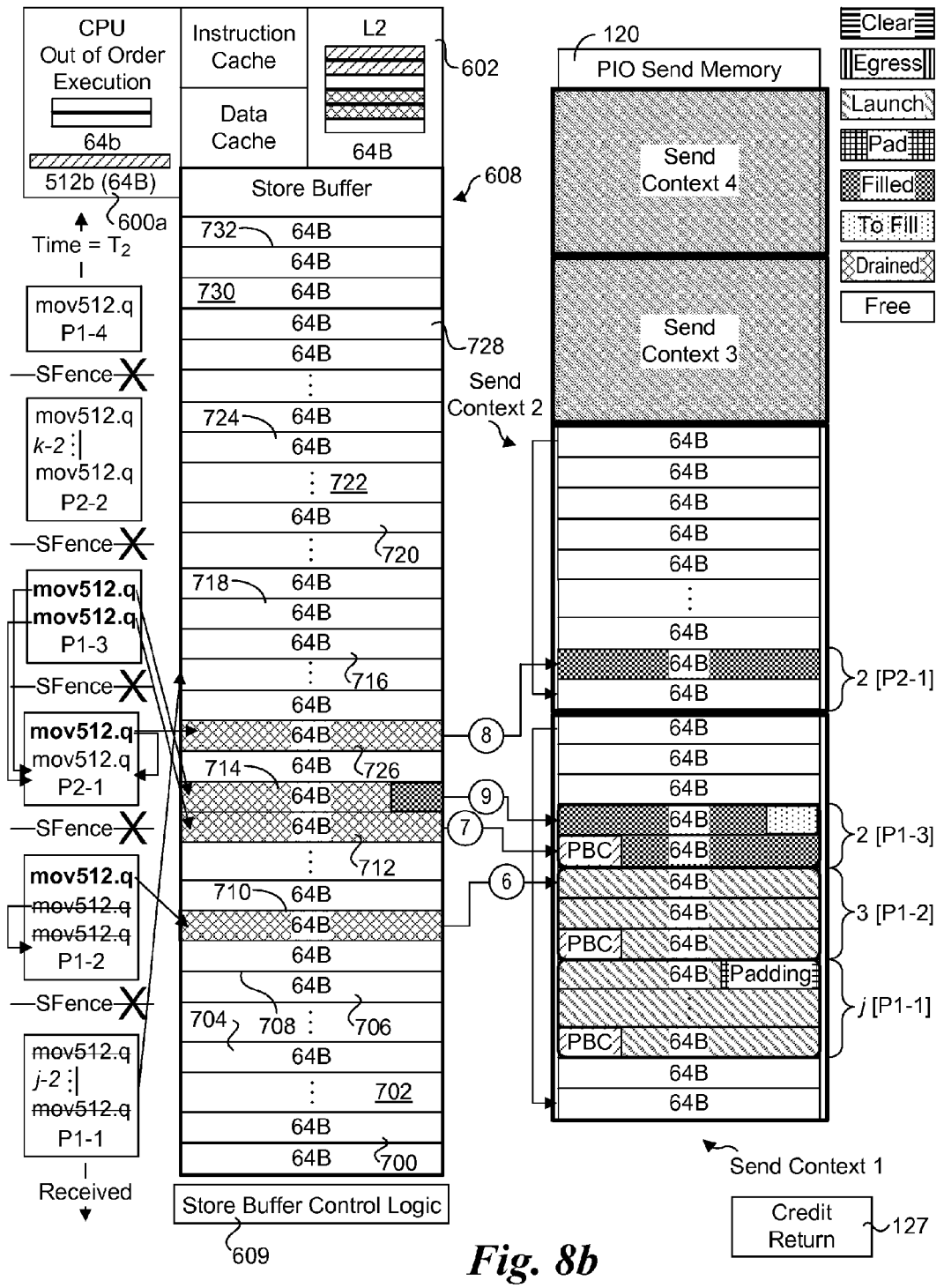

During timeframe $T_2$, as shown in FIG. 8b, the last mov512.q instruction for packet P1-2 is executed, moving the data first to store block 710, which is then drained via a 64 B PCIe posted write '6', which completes filling of the send blocks for packet P1-2. As a result, the head packet status is marked for launch arbitration. Instructions for each of packets P2-1 and P1-3 are executed out of order, as illustrated by the order of 64 B PCIe posted writes '7', '8', and '9', the last of which is shown in progress but not yet completed. The mov512.q instruction for the first send block of packet P2-1 has yet to be executed. As before, since the first send block (and thus the send block that will include the SOP bit set in the corresponding 64 B PCIe posted write and contain the PBC header) has yet to be written, the control logic does not know the size of packet P2-1. The FIFO slot occupied be the first send block for packet P2-1 is also still marked as free. Conceivably if the last block in the send context 2 FIFO was marked as something other than free then the logic could be configured to determine that this FIFO slot corresponds to the first send block for packet P2-1 (since it would have to go there), but this doesn't really provide a benefit relative to waiting for the first send block to arrive.

Figure 8C:
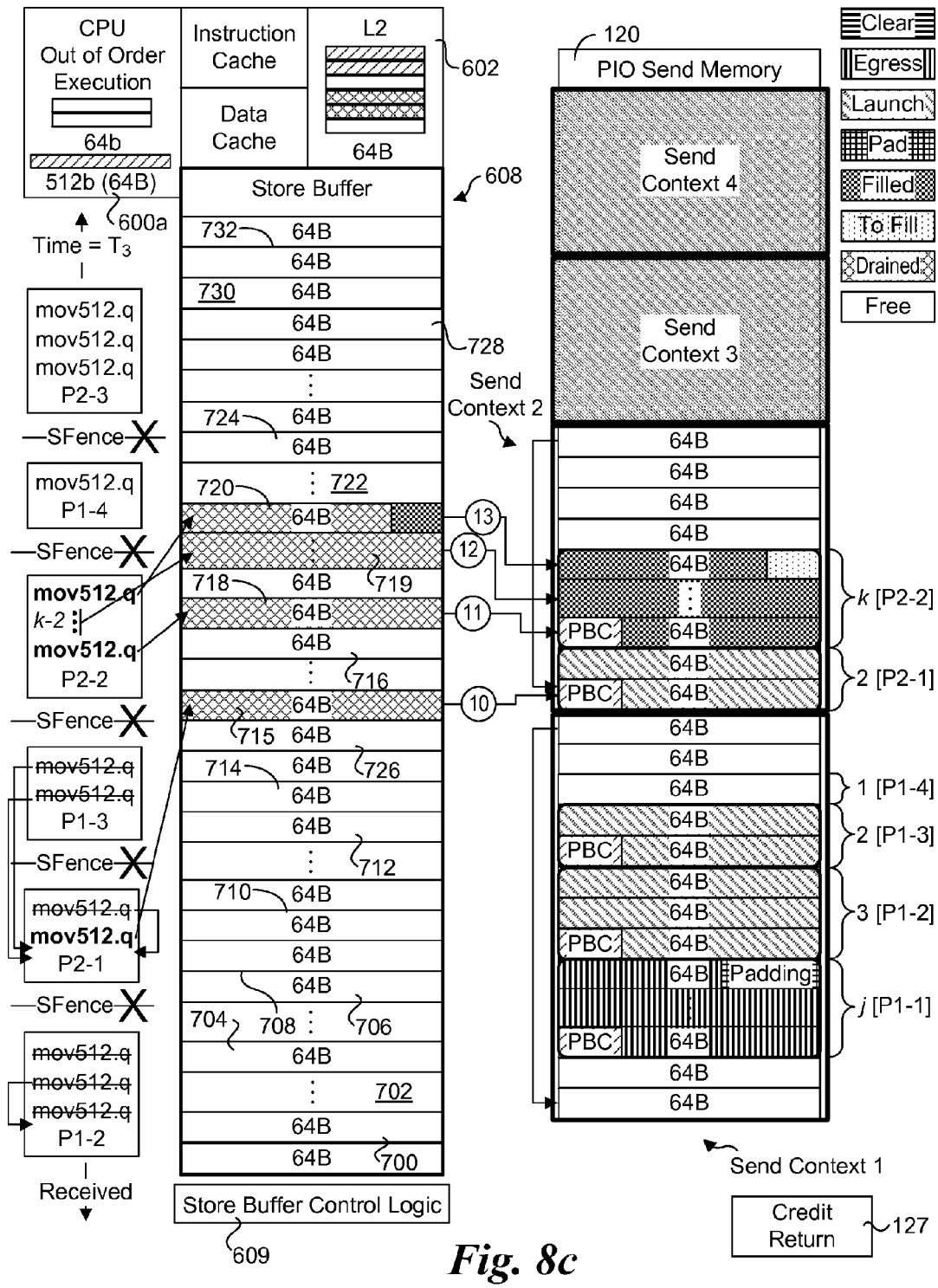

During timeframe $T_3$ depicted in FIG. 8c, the mov512.q instruction for writing the first send block is executed, resulting in store block 715 being filled and drained via 64 B PCIe posted write '10'. The control logic detects this corresponds to the start of packet P2-1, inspects the Pbc-LengthDWs field of the PBC header and determines the packet fill size is two send blocks. Since the second send block has already been filled, filling this first send block results in the entire packet being filled, and thus the head packet status is marked for launch arbitration. In addition, the k mov512.q instructions for packet P2-2 are executed, resulting in the filling and draining of store block 718, k−2 store blocks 719, and filling with draining in process for store block 720. Upon inspection of the PBC header for packet P2-2, it is determined that this packet's fill size is k send blocks. Also during timeframe $T_3$, packet P1-1 has been selected for egress, with egress of packet P1-1 in process.

Figure 8D:
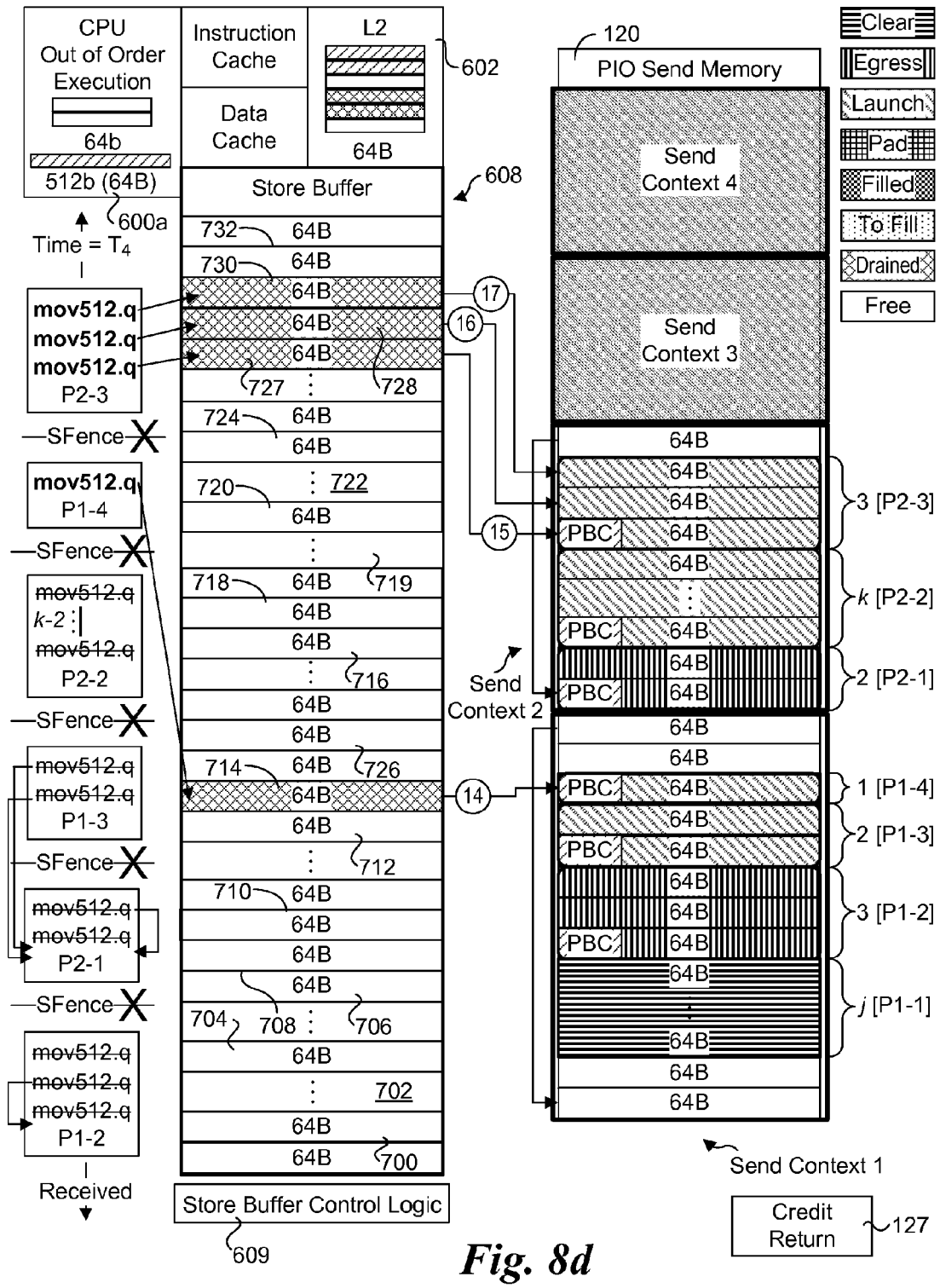

During timeframe $T_4$ depicted in FIG. 8d, the single mov512.q corresponding to packet P1-4 is executed, writing all of this packet's data first to store block 714 and then to the single send block in PIO send memory 120 via 64 B PCIe posted write '14'. The entirety of packet P2-3 is also written to PIO send memory 120 via store blocks 727, 728, and 730 and 64 B PCIe posted writes '15', '16', and '17'. Each of the head packet for packets P1-4 and P2-3 is marked for launch arbitration. In addition, each of packets P1-2 and P2-1 have been selected for egress and packet data in these packets' corresponding send blocks is currently being egressed.

As discussed above, during timeframe $T_3$ the packet data for packet P1-1 started egress. During timeframe $T_4$ egress has completed, and the send blocks are marked as cleared. In accordance with the embodiment discussed above, an absolute credit return count of 2+j credits would be returned at this point (presuming credits for all prior packets for send context 1 that are not shown have been returned previously). However, as explained below in the discussion of the credit return mechanism, in some embodiments credits are aggregated across multiple packets and are not returned until a threshold of credits since the last credit return has been reached. In this example, the threshold has yet to be reached, resulting in no return credits at this point.

Figure 8E:
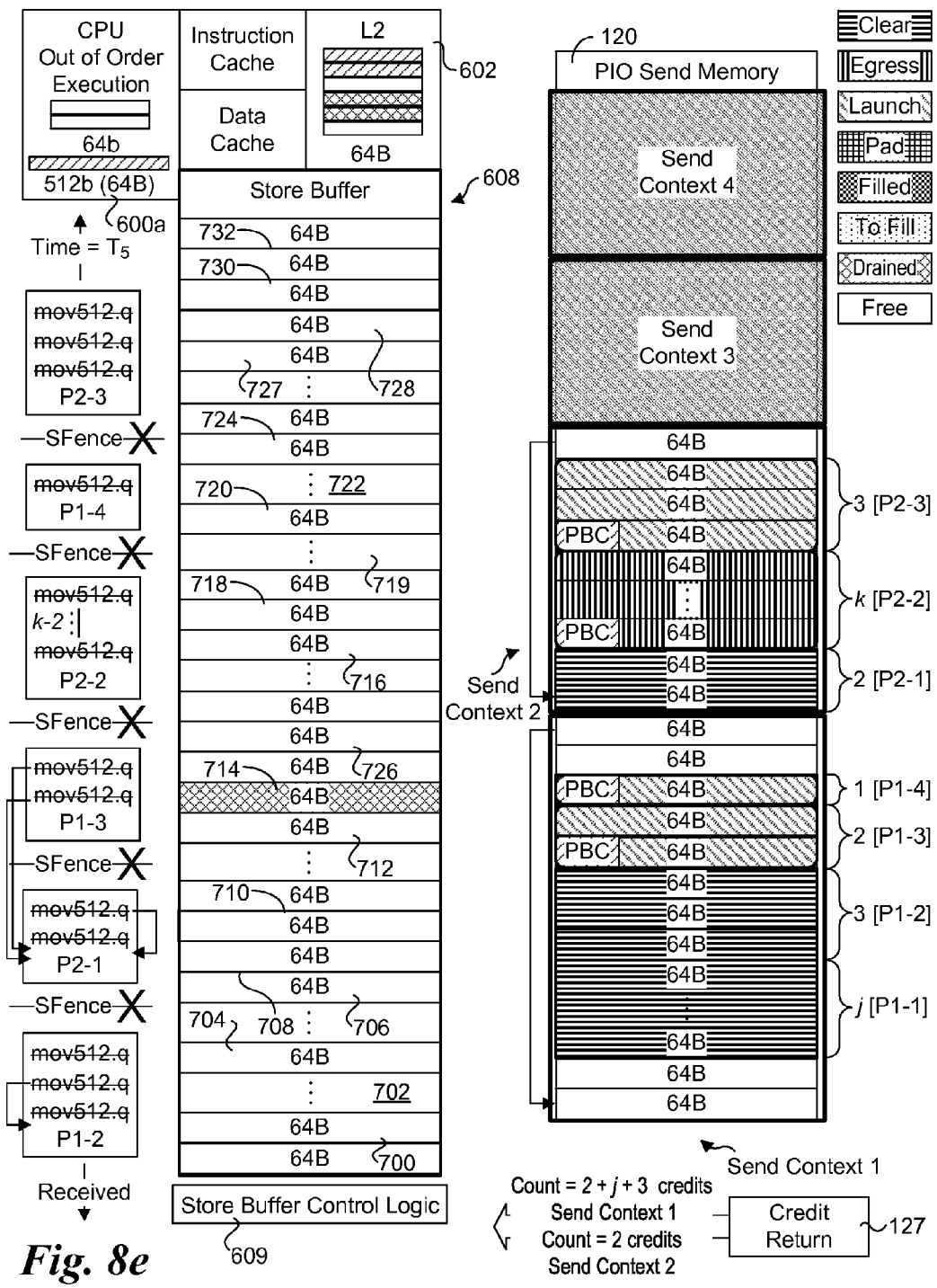

During timeframe $T_5$ depicted in FIG. 8e, each of packets P1-2 and P2-1 have completed egress and are marked as cleared, while packet P2-2 has been selected for egress and begins egressing. Aggregated credit return may be configured on a per send context basis, such that it may be employed for some send contexts and not employed for others. In addition, the aggregated credit threshold may be configured on a per send context basis. Accordingly, in this example the aggregated credit threshold for send context 1 has been reached, and thus a running return credit count value of 2+j+3 is returned via credit return block 127. In addition, send context 2 is not employing an aggregated credit threshold and thus a running return credit count value of 2 credits is returned. In one embodiment, running credit count values for multiple send contexts can be send in a single DMA write to memory over PCIe.

FIGS. 9a and 9b illustrate data flow timelines corresponding to transfer of packet data using 64 B PCIe posted writes with and without SFENCE instructions, respectively. When drained from store buffer 608, which is part of the processor core, it first is forwarded to IIO 610, as shown in FIGS. 6a and 6b. There is some additional latency at the IIO, as it has to handle other IO requests in addition the PCIe posted write requests discussed herein. Notably, the IIO returns an sfence Acknowledgement (ack) for each sfence instruction. This prevents out of order instructions from being executed across sfences, potentially resulting in delays until all instructions for the packet prior to the sfence have been executed. Under the embodiments herein that remove the use of sfences, these potential delays are prevented from occurring, optimizing the PIO send block write efficiency.

FIG. 10 shows further details of egress block 126, accordingly to an embodiment. Head packet status from each of the (up to) 160 send contexts is tracked in a block 1000, while head packet status for each of the 16 SDMA queues is tracked in a block 1002. Blocks 1000 and 1002 provide inputs to a round robin launch arbiter 1004 that provides outputs to a plurality of per-VL launch FIFOs 1006, whose outputs are received as inputs to a VL arbiter 1008. The VL arbiter provides input controls to a multiplexer (Mux) 1010 that is coupled to each of PIO send memory 120 and SDMA memory 124. Egress block 126 further includes process blocks 1012, 1014, and 1018 and an egress FIFO 1016.

Egress block 126 is responsible for arbitrating packets from the 160 send contexts and 16 SDMA engines and to select the next available, complete packet to launch from its send buffer memory into a per-VL launch FIFO 1006. The per-VL launch FIFOs are deep to minimize blocking between VLs, and contain only control information for the packets including pointers to the packets in the PIO send memory 120 and SDMA memory 124. The actual packet datapath does not flow through per-VL launch FIFOs 1006, but rather these FIFOs are used to provide per-VL inputs to VL arbiter 1008, which performs a VL arbitration across the launch FIFOs to select the next packet to egress. This causes egress block 126 to start fetching the data for that packet from PIO send memory 120 or SDMA memory 124 via mux 1010, and then packet integrity checks are applied in process block 1012. Finally, the Packet Egress pipeline performs any necessary modifications to the packet (e.g. HCRC/ICRC insertion in process block 1014, FIFO buffering in egress FIFO 1016, and PBC removal, and packet framing for egress in process block 1018) and presents the packet to fabric port 112.

In one embodiment, transmit engine 108 supports 8 data VLs, and 1 management VL. However, this is merely exemplary and non-limiting. Packets are assigned to a virtual lane (VL) by software when the packet is constructed using a VL field in the PBC header.

In one embodiment, packets that are sent using PIO Sends to a send context will be launched in the order that is defined by the placement of those packets into the send context's send buffer. This is called the "original program order." Essentially this means that the send buffer behaves as a FIFO, though there is flexibility on the filling of the send buffer to reassemble the program's original packet order even when using the loose ordering semantics provided by the processor's write-combining feature. For the purposes of this ordering discussion, the essential point is that software chooses the packet order on a send context, and the send context maintains that packet order through to packet launch.

Once a complete packet is filled into a send buffer, either by PIO Send or SDMA, the packet can be launched by the transmit engine. Launch of a packet from a send buffer places the packet on a per-VL FIFO. The launch order of packets with the same VL specifies the order that the packets with that VL will be egressed to the link. The order in which packets at the head of the per-VL FIFOs are selected is determined by the VL arbitration algorithm.

Note that software can send packets with different VLs by PIO Send on one send context. Similarly, it can send packets with different VLs by SDMA on one SDMA queue. The implementation will preserve the packet order through the send context or the SDMA queue up to the launch point even when the packets are on different VLs. However, beyond launch there is no guaranteed ordering because of the per-VL launch FIFO, and the actual egress order to the link will depend on the details of VL arbitration.

Under one embodiment, packets for the same send context that are to be transmitted using the same VL will be egressed in original program order. Meanwhile, packets to be transmitted using different VLs may be egressed out of order, such that a later-written packet may proceed an earlier-written packet if they are to be transmitted over different VLs.

In one embodiment, the HFI provides no guarantee on launch order beyond the above defined ordering. For example, the launch order of packets on any SDMA queue is not ordered by the HFI with respect to packets on any other SDMA queue or with respect to any packets sent using PIO Send. Additionally, the launch order of packets on any send context is not ordered by the HFI with respect to packets on any other send context or with respect to any packets sent using SDMA.

FIG. 11 is a flowchart illustrating operations, phases, and states that are implemented in preparing packet data for egress outbound on a fabric link coupled to an HFI. During a packet fill phase 1102, the send memory is being filled with the packet data either via the PIO send or SDMA mechanism. Packet complete state 1104 occurs when all of the packet data is buffered in the send memory. At this point, packet filling is complete and the packet is eligible for launch.

Packet launch 1106 is the point at which the packet is launched from the send memory onto a per-VL launch FIFO. During this phase the packet data still occupies the send buffer state, but at launch the packet is now ready for egress and its order with respect to other packets on that same VL is established.

During Packet VL arbitration 1108 the packets at the heads of the per-VL launch FIFOs are arbitrated between, and one is selected by the VL arbitration algorithm to be egressed to the link. During packet egress 1110, packet data for the packet selected via VL arbitration is read from the send memory (PIO send memory 120 or SDMA memory 124, as applicable) and packet integrity checks are performed in block 1012 to determine whether the packet data is valid. Packets that fail integrity checks are dropped, while good packets are egressed to the link, which may include insertion of an HCRC and ICRC, if required, and buffering in Egress FIFO 1016.

The next state is packet cleared 1112. This state occurs when the packet has cleared the send buffer and the send buffer is available for reuse. Accordingly, in return credit block 1114 one or more credits for the send buffer are returned via credit return mechanism 127, and the cleared send blocks become available to be filled with new packet data. Note, however, that an implementation can optimize credit return and send buffer reuse down to the send block level so that some send blocks could be reused before the entirety of the packet has egressed to the link. This can be an important implementation where send buffer resources are limited. In addition, as explained above, although a send block may be cleared, if there are other send blocks below it in the FIFO that have not cleared, the credit for the block will not be returned until those blocks are also cleared.

Credit Return Mechanism

The PIO Send mechanism uses a credit return mechanism to ensure that send buffer blocks are not over-written by software prior to the previous packet clearing the send buffer. In one embodiment, send credits are at 64 B granularity, and one send credit corresponds to one (64 B) send block. Send credits for a send context are returned in-order and software uses the send buffer memory in a wraparound FIFO manner. Send credit accounting uses absolute numbers so that the HFI can overwrite the credit return information at any time with a more up-to-date value without loss of send credits. Credit return also provides status information and this is over-written by successive credit return writes. When an error is encountered, a credit return is forced with an error indication set, and the send context is placed in an error state and no further credit return writes will be scheduled until the send context is recovered from the error state by host system software. This ensures that error indications in the credit return location can be observed and dealt with appropriately by host software without risk of being overwritten.

In simple terms, credit tracking is achieved by maintaining a running count of the number of credits that have been consumed and a running count of the number of credits that have been freed. The number of credits that is currently occupied is then the delta between these counts. As mentioned above, these are absolute counters that simply increment appropriately as credits are consumed or freed.

After initialization, a send buffer will be empty and all send credits for that buffer are available to software. In one embodiment, the maximum number of send credits that can be assigned to a send context is 1024, corresponding to a 64 KB maximum size for a send buffer. In one embodiment 11-bit counters are used to track credit information. This approach uses one extra bit so that the counters can differ in value by the full 1024 value. This also allows the cases where 0 credits are available and 1024 credits are available to be disambiguated. Counter math is performed modulo 2048. For example, advances of the 11-bit counters and differences between 11-bit counters are performed modulo 2048.

In more detail, both software and hardware each maintain an 11-bit counter per send context to track credit usage. The software counter is called the fill counter. The hardware counter is called the free counter. Hardware DMAs its counter value, at appropriate intervals, to a shadow free counter held in host memory so that software has visibility of credit return. Initially, both counters are 0 and no send credits are in use. The number of used credits is calculated as the fill counter minus the free counter, modulo 2048. The number of available credits is then the total number of credits in the send context minus the number of used credits. When both counters have the same value the context is empty and all of its send credits are available for software to fill. Software check for available credits before writing send blocks to a send context. As software fills a send block it increments its fill counter, modulo 2048, to indicate the current extent to which software has used credits. When software has no credits available it will wait for credits to free up. Software can monitor the shadow free counter in host memory to determine when credits are free.

Pseudo code corresponding to an abstract model of credit tracking is shown below.

| PSEUDO CODE LISTING 1 |
| --- |
| ```
class SendBuffer :
    def __init__ (self, num_credits) :
        assert(num_credits >= 1 and num_credits <= 1024)
        self.num_credits = num_credits
        self.fill_counter = 0
        self.free_counter = 0
        self.fill_index = 0
        self.egress_index = 0
        self.packet_credits = [ ]
        for i in xrange(0, num_credits) :
            self.packet_credits.append(0)
    def get_num_credits (self) :
        return self.num_credits
    def get_used_credits (self) :
        return (self.fill_counter - self.free_counter) % 2048
    def get_free_credits (self) :
        return self.num_credits - self.get_used_credits( )
    def fill_credits (self, num_credits) :
        # If there is sufficient space, this method fills the send buffer
        # with num_credits and returns True. Otherwise, it returns False.
        assert(num_credits > 0)
        free_credits = self.get_free_credits( )
        if num_credits <= free_credits :
            self.packet_credits[self.fill_index] = num_credits
            self.fill_index = (self.fill_index + num_credits) % self.num_credits
            self.fill_counter = (self.fill_counter + num_credits) % 2048
            print 'Buffer (%d used, %d free): filled %d credits' % \
                (self.get_used_credits( ), self.get_free_credits( ), num_credits)
            return True
        else :
            return False
    def free_credits (self) :
        # If there is a packet to egress, this method egresses that packet,
        frees
        # its credits and returns a value indicating that number of credits.
        # Otherwise, it returns False.
        num_credits = self.packet_credits[self.egress_index]
        if num_credits :
            self.packet_credits[self.egress_index] = 0
            self.egress_index = (self.egress_index + num_credits) %
            self.num_credits
            self.free_counter = (self.free_counter + num_credits) % 2048
            print 'Buffer (%d used, %d free): returned %d credits' % \
                (self.get_used_credits( ), self.get_free_credits( ), num_credits)
        return
    num_credits
    def show
    (self) :
        print 'Buffer %d used, %d free, %d total' % \
            (self.get_used_credits( ), self.get_free_credits( ),
            self.num_credits)
import random
send_buffer = SendBuffer(100) send_buffer.show( )
packet_fifo = [ ]
count = 0
while count < 100 :
    if random.random( ) >= 0.25 :
        fill = int(random.uniform(1, 20))
``` |

PSEUDO CODE LISTING 1

```
while not send_buffer.fill_credits(fill) :
        credits = send_buffer.free_credits( ) assert (credits)
        expected_credits = packet_fifo.pop(0) assert(credits ==
    expected_credits) packet_fifo.append(fill)
    count += 1
  else :
    credits = send_buffer.free_credits( ) if credits :
        expected_credits = packet_fifo.pop(0) assert(credits ==
        expected_credits)
    print 'Total of %d packets filled with %d
            (count, len(packet_fifo))
print 'All %d packets posted, now draining while True :
  credits = send_buffer.free_credits( ) if credits :
    expected_credits = packet_fifo.pop(0)
    assert(credits == expected_credits) else :
    break
  print 'Total of %d packets filled with %d (count, len(packet_fifo))
```

In one embodiment, send credit return is aggregated to reduce the PCIe and host memory bandwidth that is consumed. Each send context is programmed with a credit threshold value called SendCtxtCreditCtrl.Threshold. The send context maintains a counter value that tracks the oldest send block (in terms of address order within the send buffer) that has not yet been egressed to the fabric. As discussed above, egress of send blocks can be out-of-order when multiple VLs are used in a single send buffer. To address this situation hardware state is employed to track the out-of-order egress such that an in-order credit return can be provided. The delta between the counter for this oldest send block minus the hardware copy of the free counter is the number of pending free credits that have not yet been returned to software. When this value matches or exceeds the threshold, send credit return is initiated for that send context.

This credit return approach leaves credits up to the threshold residing in the hardware and does not provide a way to guarantee that all credits can be returned. This is a problem for identifying that any specific send has cleared the send buffer. There are several ways provided to address this:

In many cases, host software can use the credit return threshold mechanism and will not care whether a particular PIO Send has cleared the send buffer.
  The host can read the current credit value for a send context from an adapter register using a SendCtxtCreditStatus register.
  The host can write to a SendCtxtCreditForce register to force a credit return to be scheduled for a send context.
  Allow the host to request a credit return for a specific PIO Send via a PBC bit called PbcCreditReturn.

Additionally, host software can arrange for an interrupt when credit is returned on a particular send context.

In some embodiments, an early credit return mechanism may be implemented that allows credits to be more aggressively returned to the host as soon as the packet has been committed to egress, but before the packet has actually cleared the send buffer. This allows the host to get started on the next packet to optimize credit return latency and reduce send buffering requirements. The idea is that the host could start filling the next packet while the egress is draining the send buffer for its previous occupant. A hardware interlock is employed to ensure that the previous packet cannot be overwritten, and also a rate-matching egress FIFO is implemented so that the previous packet can be drained at fabric wire rate. This mechanism can be disabled on a per context basis in case of implementation problems. This is an important optimization for improving performance where send credits per context are low (e.g. when using large numbers of contexts and larger MTU sizes).

A per-send context configuration bit (SendCtxtCreditCtrl.EarlyReturn) is provided to enable or disable early credit return. When enabled, individual send blocks can be freed up early by the hardware (i.e. prior to egress of the packet clearing that send block) and these early freed credits are returned using the usual credit return algorithms. The credit return threshold mechanism still applies.

Note that software is to ensure that there are sufficient credits assigned to a send context for the packets that it wishes to send. If there are insufficient credits assigned to a send context for a particular packet, then sufficient credits will never become available to launch the packet. One approach is for software to limit the packet size based on the number of send blocks assigned to the send context. This calculation should consider that credits up to the credit threshold value for the context may reside in the hardware and will not be automatically returned until future send blocks are egressed.

In one embodiment, a send credit return is implemented as a 64 B write to host memory to a 64 B cache-line aligned address. The reason for this is to avoid read-modify-write operations on memory from the IIO since these operations add additional latency and can impact pipelining of accesses to host memory. However, this means that credit return consumes additional PCIe bandwidth. Although this is mitigated by the send credit return aggregation it is desirable to reduce this further where possible. In one embodiment this is facilitated via use of aggregating credits across send context groups, as described below.

In one embodiment, each 11-bit credit return value is combined with context status, and padded up with reserved bits to make a 64-bit value. In one embodiment, 64-bit values support up to 8 credit returns to be packed into a 64 B write for a group credit return.

One technique for reducing credit return overhead is to aggregate credit returns across send context groups. The idea is that send contexts can be grouped together and then credit return for a group of contexts is performed with a single 64 B write to host memory. In one embodiment, the 160 send contexts are aggregated into sets of 8 consecutive send contexts giving a total of 20 sets. However, other aggregations of send contexts may be used.

The set size of 8 send contexts allows for 20 different sets with the ability to specify the grouping independently per set. Set number S contains send contexts 8S to 8S+7 inclusive. The set mappings for one embodiment are shown in TABLE 2. The choice of 20 sets gives reasonable flexibility in the typical configurations of 40, 80 and 160 send contexts. In configurations with reduced numbers of send contexts, software gets additional flexibility when selecting which send contexts to use depending on the required grouping. Each set can be independently configured into the configurations shown in TABLE 3.

TABLE 2

| Set Number | Send Contexts In The Set |
|---|---|
| 0 | 0 to 7 |
| 1 | 8 to 15 |
| ... | ... |
| 19 | 152 to 159 |

TABLE 3

| Value (B) | Number Of Groups | Send Contexts Per Group (G) |
|---|---|---|
| 0 | 8 | 1 (i.e. no actual grouping) |
| 1 | 4 | 2 |
| 2 | 2 | 4 |
| 3 | 1 | 8 (i.e. maximum grouping) |

With the minimum value of 0, the set has 8 groups with 1 send context per group (i.e. no actual grouping). This gives full flexibility since every send context in that set will have independent credit return. With the maximum value of 3, the set has 1 group containing all 8 send contexts and credit return is aggregated for all 8 send contexts. Accordingly, the host memory page that is used for that set's credit return is shared by those 8 send contexts. Note that only a read-only mapping of that page is required since software does not write to the credit return location. The maximum group size of 8 gives up to an 8× reduction in credit return bandwidth, depending on how the credit return algorithms of those 8 send contexts interact with each other.

Each send context has a SendCtxtCreditReturnAddr register that specifies the host physical address and TPH information that is used for credit return for that send context. When send context grouping is used, credit return uses the SendCtxtCreditReturnAddr register belonging to the context that triggered the credit return. In one embodiment software is used to program the SendCtxtCreditReturnAddr registers for all contexts in a group with the same address.

When a credit return is initiated by a particular send context (denoted N), the send context is mapped to the set number (S) by right shifting the send context number by 3. The set number is used to look up into the per-set configuration state and gives a value B as shown in the left-most column of TABLE 3. B is the number of least significant bits of send context number that distinguishes send contexts in the same group. The number of send contexts in that group is G and is equal to 1<<B, and takes the value in the right-most column of TABLE 3. The lowest send context number in this set is called M and has the value (N>>B)<<B, that is the value of N with the least significant B bits cleared.

In one embodiment, credit return is achieved as follows. Credit return is aggregated for the G send contexts using one 64 B write. The address for the return is specified in the SendCtxtCreditReturnAddr register for context number M (the lowest numbered context in the group), while the G send contexts for this credit return are numbered M through M+G−1 inclusive. The credit information for each send context in the group is a QW, with G such values packed into the 64 B credit return write. For I in the range [0, G−1], the credit being returned is for send context number M+I and the credit is placed into the QW with index (M+I) & 0x7. Thus the index is simply specified by the lowest 3 bits of the send context number, and the credit return value for any particular send context is always in the same position in the 64 B credit return value, regardless of the value of G, eliminating shift operations in the implementation. Unused QWs in the credit return value are filled with a value of 0x0.

All combinations for the credit return value are summarized in TABLE 4. There are 8 columns for the different index values into the 64 B credit return. Index 0 corresponds to bytes 0 to 7, index 1 to bytes 8 to 15, and so on. Each row depicts one combination of credit return values for that specific value of G (which is the number of send contexts per group). Empty cells indicate an unused QW and these have zero values. The notation CRx (where x is in 0 to 7) indicates the credit return value for a context with the least 3 significant bits equal to x. Each CRx QW value has the format defined by TABLE 2. For example, when G is 1 there is one credit return value and it will be in one of the 8 locations depending on the send context number. When G is 8 there are 8 credit return values and all 8 locations are used.

TABLE 4

| G | Index 7 | Index 6 | Index 5 | Index 4 | Index 3 | Index 2 | Index 1 | Index 0 |
|---|---|---|---|---|---|---|---|---|
| 1 |  |  |  |  |  |  |  | CR0 |
|  |  |  |  |  |  |  | CR1 |  |
|  |  |  |  |  |  | CR2 |  |  |
|  |  |  |  |  | CR3 |  |  |  |
|  |  |  |  | CR4 |  |  |  |  |
|  |  |  | CR5 |  |  |  |  |  |
|  |  | CR6 |  |  |  |  |  |  |
|  | CR7 |  |  |  |  |  |  |  |
| 2 |  |  |  |  |  |  | CR1 | CR0 |
|  |  |  |  |  | CR3 | CR2 |  |  |
|  |  |  | CR5 | CR4 |  |  |  |  |
|  | CR7 | CR6 |  |  |  |  |  |  |
| 4 |  |  |  |  | CR3 | CR2 | CR1 | CR0 |
|  | CR7 | CR6 | CR5 | CR4 |  |  |  |  |
| 8 | CR7 | CR6 | CR5 | CR4 | CR3 | CR2 | CR1 | CR0 |

When credit is returned for a send context group, the free counter for each send context in the group is updated to the credit counter value that is DMA transferred to the shadow copy held in host memory. This approach means that when one send context triggers credit return for a group based on its threshold value, that credit return is provided for all other send contexts in that group to the maximum extent possible. This approach reduces the frequency of send credit updates for the group as a whole providing that send block egress is reasonably interleaved across members of the group. Note that the threshold value needs to be larger than the number of send blocks in the largest packet for this mechanism to be effective.

Figure 12:
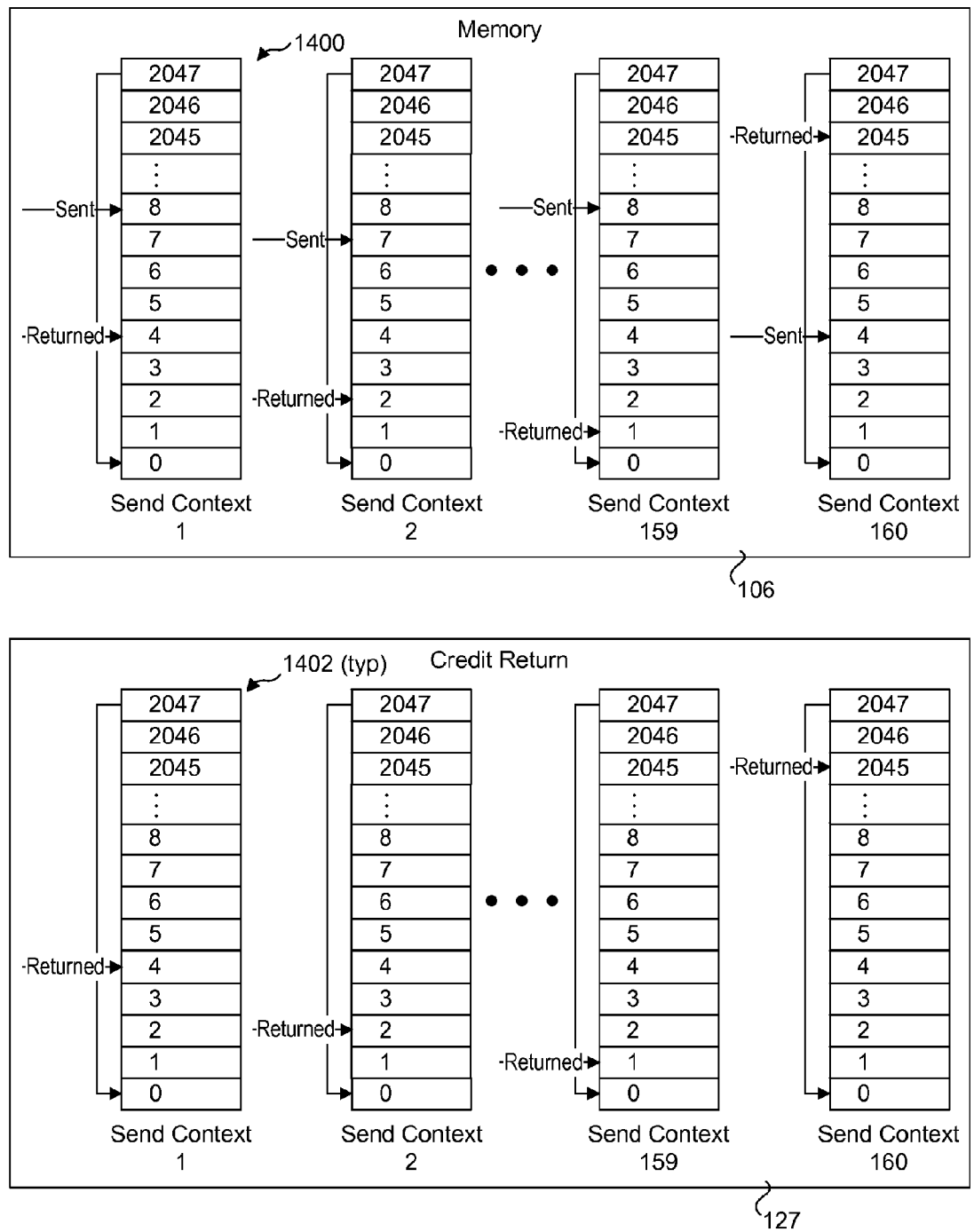
FIG. 12 is a diagram illustrating PIO send address FIFOs and credit return FIFOs, according to one embodiment.

FIG. 12 shows an exemplary configuration of PIO send address FIFOs 1200 and credit return FIFOs 1202 used to support PIO write management using absolute credits, according to one embodiment. A PIO send address FIFO 1400 is implemented for each send context in memory 106 under the management of software that generated the PIO send memory writes. As discussed above, in one embodiment 11-bit running counters are used in combination with FIFO semantics to track available credits (which correspond to available send blocks within each send context). As each send block worth of instructions is generated and forwarded for execution by a processor core, the software increases its running count for the send context to which the send blocks are to be written. Meanwhile, on the receiving end, credit return mechanism 127 maintains an 11-bit running count of absolute credits returned. As credits are returned, the running count is advanced. The FIFOs use circular FIFO semantics under which one the count reaches 2047 it is returned to 0. The software also keeps track of the absolute return credits for each send context. As long as the difference between the sent absolute running count and the returned absolute running counts is less than the size of a send context, the software can generate additional PIO send memory writes. Once the difference reaches the size of the send context, writing of packet data to the send context is paused until an updated absolute running count is received via credit return mechanism 127.

Exemplary HFI Implementation Architectures

Figure 13:
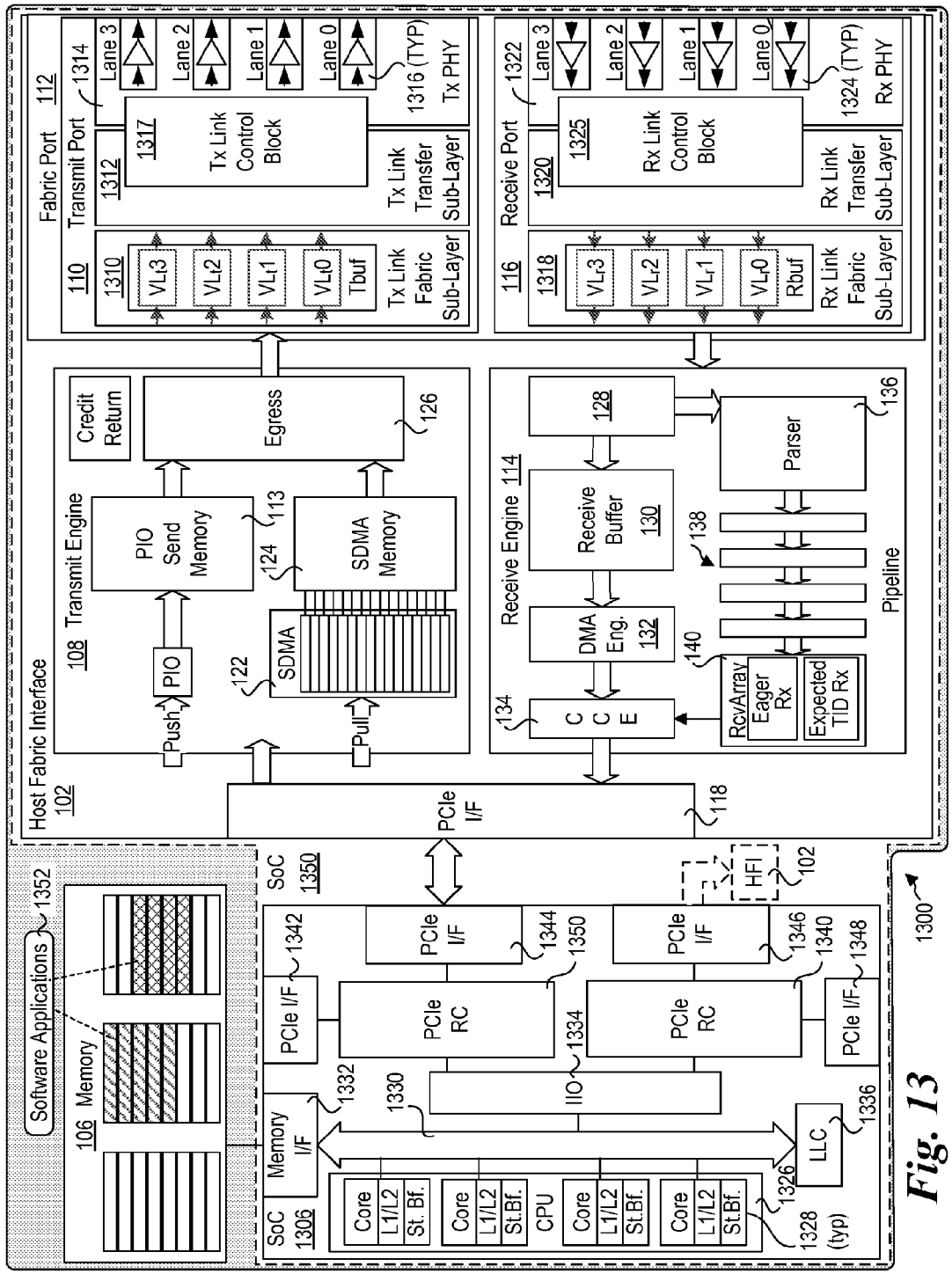
FIG. 13 is a schematic diagram of a system node including an HFI, according to one embodiment.

FIG. 13 shows a system node 1300 having an exemplary configuration comprising a host fabric interface 102 including a fabric port 112 coupled to a processor 1306, which in turn is coupled to memory 106. Fabric port 112 includes a transmit port 110 and a receive port 116 having a high-level configuration similar to that shown in FIG. 1. Transmit port 110 includes Tx Link Fabric Sub-layer circuitry and logic 1310 including a transmit buffer (Tbuf) partitioned into a plurality of transmit VL buffers, Tx Link Transfer Sub-layer circuitry and logic 1312, and Tx PHY circuitry and logic 1314 including four transmitters 1316, and a Tx Link Control Block 1317. Receive port 116 includes Rx Link Fabric Sub-layer circuitry and logic 1318 including a receive buffer (Rbuf) partitioned into plurality of receive VL buffers, Rx Link Transfer Sub-layer circuitry and logic 1320, and Rx PHY circuitry and logic 1322 including four receivers 1324, and an Rx Link Control Block 1325.

Tx PHY circuitry and logic 1314 is illustrated in a simplified form that includes four transmitters 1316 and a portion of Tx Link Control Block 2017. Generally, transmitters 1316 may comprise electrical or optical transmitters, depending on the PHY layer configuration of the link. It will be understood by those having skill in the networking arts that a Tx PHY circuitry and logic block will including additional circuitry and logic for implementing transmit-side PHY layer operations that are not shown for clarity. This including various sub-layers within a PHY layer that are used to facilitate various features implemented in connection with high-speed interconnect to reduce errors and enhance transmission characteristics.

Rx PHY circuitry and logic 1322 is illustrated in a simplified form that includes four receivers 1324 and a portion of Rx Link Control Block 2025. Generally, receivers 1324 may comprise electrical or optical transmitters, depending on the PHY layer configuration of the link, and will be configured to receive signals transmitter over the link from transmitters 1316. It will be understood by those having skill in the networking arts that an Rx PHY circuitry and logic block will including additional circuitry and logic for implementing receive-side PHY layer operations that are not shown for clarity. This including various sub-layers within a PHY layer that are used to facilitate various features implemented in connection with high-speed interconnect to reduce errors and enhance transmission characteristics.

HFI 1302 further includes a transmit engine 108 and a receive engine 114 coupled to a PCIe interface 118. Each of transmit engine 108 and receive engine 114 are configured in a similar manner to transmit engine 108 and receive engine 114 of FIG. 1, as described above.

Processor 1306 includes a CPU 1326 including a plurality of processor cores 1328, each including integrated Level 1 and Level 2 (L1/L2) caches and coupled to an coherent interconnect 1330. In the illustrated embodiment, a store buffer (St. Bf.) is also shown coupled to each core 1328; optionally, a store buffer may be shared across all or a portion of the processor cores in a processor. Also coupled to coherent interconnect 1330 is a memory interface 1332 coupled to memory 106, an integrated input/output block (IIO) 1334, and a Last Level Cache (LLC) 1336. IIO 1334 provides an interface between the coherent domain employed by the processor cores, memory, and caches, and the non-coherent domain employed for IO components and IO interfaces, including a pair of PCIe Root Complexes (RCs) 1338 and 1340. As is well-known in the art, a PCIe RC sits at the top of a PCIe interconnect hierarchy to which multiple PCIe interfaces and PCIe devices may be coupled, as illustrated by PCIe interfaces 1342, 1344, 1346, and 1348. As shown, PCIe 1344 is coupled to PCIe interface 118 of HFI 102.

Figure 14:
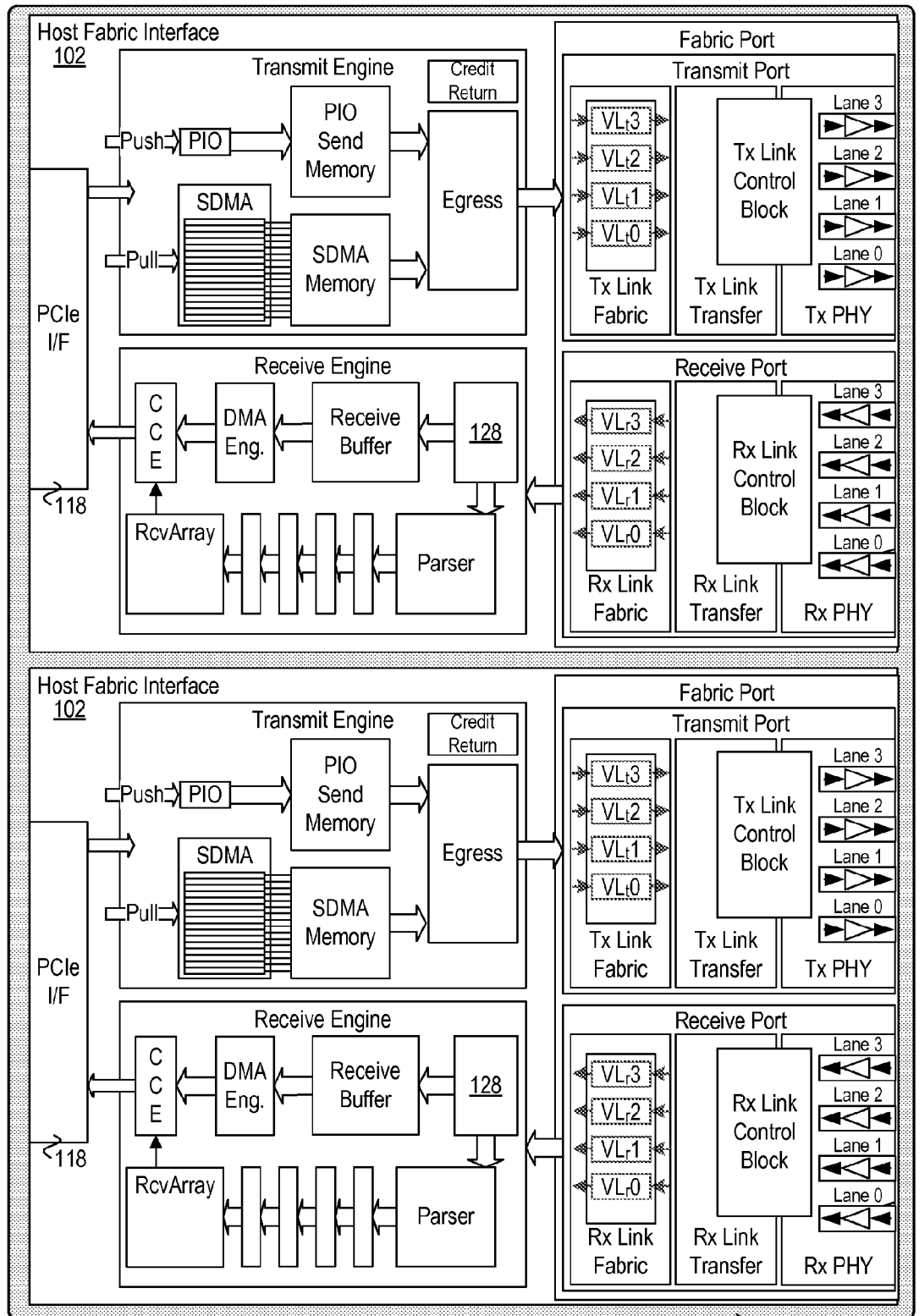
FIG. 14 is a schematic diagram of an ASIC including two HFIs.

In some embodiments, such as illustrated in FIG. 13, processor 1306 employs an SoC architecture. In other embodiments, PCIe-related components are integrated in an IO chipset or the like that is coupled to a processor. In yet other embodiments, processor 1306 and one or more HFIs 102 are integrated on an SoC, such as depicted by the dashed outline of SoC 1350. Also, as shown, a second HFI 102 is shown coupled to PCIe interface 1346, wherein the dashed outline indicates this is an optional configuration. In one embodiment, multiple HFI's are implemented on an ASIC (Application Specific Integrated Circuit) 1400, as shown in FIG. 14.

As further illustrated in FIG. 13, software applications 1352 comprise software components running on one or more of processor cores 1328 or one or more virtual machines hosted by an operating system running on processor 1306. In addition to these software components, there are additional software components and buffers implemented in memory 106 to facilitate data transfers between memory 106 (including applicable cache levels) and transmit engine 108 and receive engine 114.

Further aspects of the subject matter described herein are set out in the following numbered clauses:

1. A method comprising:

receiving sequences of Programmed Input/Output (PIO) write instructions to write packet data for respective packets stored in memory to a PIO send memory on a network adaptor;

executing the sequences of PIO write instructions as an instruction thread on a processor that supports out of order execution, wherein execution of PIO write instructions cause data to be written to store units in a store buffer, the store units grouped into store blocks comprising a line of store units; wherein a portion of the PIO write instructions are executed out of order resulting in data being written to store units in different store blocks prior to the store blocks being filled;

detecting when store blocks are filled; and in response to detecting a store block is filled, draining the data in the store block via a posted write to a buffer in the PIO send memory.

2. The method of clause 1, wherein the memory employs 64-Byte (64 B) cache lines, each store blocks comprises 64 Bytes of data, and the posted write comprises a 64 B PCIe (Peripheral Component Interconnect Express) posted write.

3. The method of clause 1 or 2, wherein the processor comprises a 64-bit processor, and each store unit comprises 64-bits of data that is written from a 64-bit data register in the processor to a store unit using a single instruction.

4. The method of any of the proceeding clauses, wherein the sequences of PIO write instructions are received as sequential groups of one or more aligned 64 B writes per respective packet, the method further comprising:
generating a packet;
determining the packet has a length that is not a multiple of 64 Bytes;
adding padding to the packet to extend its length to a multiple of 64 Bytes; and
generating PIO write instructions comprising a sequence of one or more aligned 64 B writes comprising the packet data and including padding.

5. The method of any of the proceeding clauses, wherein the processor employs write-combining, and wherein execution of out of order PIO write instructions results in data being written to store units within a store block in a non-sequential order.

6. The method of any of the proceeding clauses, wherein the PIO send memory is partitioned into a plurality of send contexts, each send context organized as a sequence of send blocks, the method further comprising:
receiving a sequence of PIO write instructions for writing data for a packet to a plurality of sequential send blocks in a sequential order; and
writing the data for the packet to the sequential send blocks in a non-sequential order.

7. The method of clause 6, further comprising:
detecting that all of the plurality of sequential send blocks have been filled with the packet data; and
enabling data in the plurality of send blocks to be egressed once all of the plurality of send blocks are filled.

8. A non-transitory machine readable medium having instructions stored thereon configured to enable a computer including a processor supporting out-of-order execution to implement the method of any of the proceeding clauses when executed on the processor.

9. A method comprising:
receiving sequences of Programmed Input/Output (PIO) write instructions to write packet data for respective packets stored in memory to a PIO send memory on a network adaptor, each PIO write instruction defining a location of a cache line in memory containing the data and a memory-mapped address of a send block in the PIO send memory to which the data is to be written;
executing the sequences of PIO write instructions as an instruction thread on a processor that supports out of order execution, wherein execution of PIO write instructions cause data to be written to store blocks in a store buffer;
wherein a portion of the PIO write instructions are executed out of order resulting in data being written to store blocks in a different order than in order in which the PIO write instructions are received;
detecting when store blocks are filled; and
in response to detecting a store block is filled, draining the data in the store block via a posted write to a send block in the PIO send memory located at the address contained in the PIO write instruction used to write the data to the send block.

10. The method of clause 9 wherein the PIO write instruction comprises a 512-bit write instruction, and each of a memory cache line, store block, and send block has a size of 64 Bytes.

11. The method of clause 10, wherein posted write comprises a 64-Byte (64 B) PCIe (Peripheral Component Interconnect Express) posted write.

12. The method of any of clauses 9-11, further comprising:
partitioning the PIO send memory into a plurality of send contexts;
employing a First-in, First-out (FIFO) storage scheme for each send context under which data for a given packet is stored in one or more sequential send blocks, wherein PIO write instructions for writing packet data for multiple packets to the same send context are sequentially grouped in an original FIFO order, and wherein the packet data for the multiple packets are enabled to be written to send blocks in a different order than the original FIFO order.

13. The method of clause 12, further comprising:
detecting that all of the one or more sequential send blocks have been filled with the packet data for a given packet; and
enabling data for the given packet to be egressed once all of the plurality of send blocks are filled.

14. The method of clause 13, further comprising:
encoding a header field in each packet with virtual lane (VL) indicia used to identify a VL associated with that packet;
enabling packets with different VLs within the same send context to be egressed out of FIFO order; and
enforcing FIFO ordering for egress of data for packets associated with the same VL within the same send context.

15. A non-transitory machine readable medium having instructions stored thereon configured to enable a computer including a processor supporting out-of-order execution to implement the method of any of clauses 8-14 when executed on the processor.

16. An apparatus, comprising:
a processor, having a plurality of processor cores supporting out of order execution and including a memory interface, at least one store buffer, and a first PCIe (Peripheral Component Interconnect Express) interface;
a second PCIe interface, coupled to the first PCIe interface of the processor via a PCIe interconnect; and
a transmit engine operatively coupled to the second PCIe interface and including a Programmed Input/Output (PIO) send memory,
wherein the processor includes circuitry and logic to,
receive sequences of Programmed Input/Output (PIO) write instructions to write packet data for respective packets stored in a memory when coupled to the memory interface to the PIO send memory;
execute the sequences of PIO write instructions as an instruction thread on a processor core, wherein execution of PIO write instructions cause data to be written to store units in a store buffer, the store units grouped into store blocks comprising a line of store units; wherein a portion of the PIO write instructions are executed out of order resulting in data being written to store units in different store blocks prior to the store blocks being filled;
detect when store blocks are filled; and
in response to detecting a store block is filled, drain the data in the store block via a PCIe posted write to a buffer in the PIO send memory sent over the PCIe interconnect.

17. The apparatus of clause 16, wherein the memory employs 64-Byte (64 B) cache lines, each store blocks comprises 64 Bytes of data, and the posted write comprises a 64 B PCIe (Peripheral Component Interconnect Express) posted write.

18. The apparatus of clause 16 or 17, wherein the processor comprises a 64-bit processor, and each store unit comprises 64-bits of data that is written from a 64-bit data register in the processor to a store unit using a single instruction.

19. The apparatus of any of clauses 16-18, wherein the processor employs write-combining, and wherein execution of out of order PIO write instructions results in data being written to store units within a store block in a non-sequential order.

20. The apparatus of any of clauses 16-19, wherein the PIO send memory is partitioned into a plurality of send contexts, each send context organized as a sequence of send blocks, and wherein the apparatus includes further circuitry and logic to:

receive a sequence of PIO write instructions for writing data for a packet to a plurality of sequential send blocks in a sequential order; and write the data for the packet to the sequential send blocks in a non-sequential order.

21. The apparatus of clause 20, further comprising circuitry and logic to:

detect that all of the plurality of sequential send blocks have been filled with the packet data; and enable data in the plurality of send blocks to be egressed once all of the plurality of send blocks are filled.

22. The apparatus of clause 21, further comprising circuitry and logic to:

inspect data in a first of the plurality of sequential send blocks to determine a length of the packet; and determine how many sequential send blocks are to be employed for storing data for the packet.

23. An apparatus, comprising:

a processor, having a plurality of processor cores supporting out of order execution and including a memory interface, at least one store buffer, and a first PCIe (Peripheral Component Interconnect Express) interface;

a second PCIe interface, coupled to the first PCIe interface of the processor via a PCIe interconnect; and a transmit engine operatively coupled to the second PCIe interface and including a Programmed Input/Output (PIO) send memory, wherein the processor includes circuitry and logic to, receive sequences of Programmed Input/Output (PIO) write instructions to write packet data for respective packets stored in memory to the PIO send memory, each PIO write instruction defining a location of a cache line in memory containing the data and a memory-mapped address of a send block in the PIO send memory to which the data is to be written;

execute the sequences of PIO write instructions as an instruction thread on a processor core, wherein execution of PIO write instructions cause data to be written to store blocks in a store buffer, wherein a portion of the PIO write instructions are executed out of order resulting in data being written to store blocks in a different order than in order in which the PIO write instructions are received;

detect when store blocks are filled; and in response to detecting a store block is filled, drain the data in the store block via a PCIe posted write to a send block in the PIO send memory located at the address contained in the PIO write instruction used to write the data to the send block.

24. The apparatus of clause 23, wherein the PIO write instruction comprises a 512-bit write instruction, and each of a memory cache line, store block, and send block has a size of 64 Bytes, and wherein the PCIe posted write comprises a 64-Byte PCIe posted write.

25. The apparatus of clause 23 or 24, further comprising circuitry and logic to:

partition the PIO send memory into a plurality of send contexts;

implement a First-in, First-out (FIFO) storage scheme for each send context under which data for a given packet is stored in one or more sequential send blocks;

detect that all of the one or more sequential send blocks have been filled with the packet data for a given packet; and enable data for the given packet to be egressed once all of the plurality of send blocks are filled, wherein PIO write instructions for writing packet data for multiple packets to the same send context are sequentially grouped in an original FIFO order, and wherein the packet data for the multiple packets are enabled to be written to send blocks in a different order than the original FIFO order via out of order execution of the PIO write instructions.

26. The apparatus of clause 25, further comprising circuitry and logic to:

encode a header field in each packet with virtual lane (VL) indicia used to identify a VL associated with that packet;

enable packets with different VLs within the same send context to be egressed out of FIFO order; and enforce FIFO ordering for egress of data for packets associated with the same VL within the same send context.

27. An apparatus, comprising:

a PCIe (Peripheral Component Interconnect Express) interface;

a transmit engine including, a Programmed Input/Output (PIO) send memory operatively coupled the PCIe interface; and an egress block, operatively coupled to the PIO send memory; and a network port including a transmit port operatively coupled to the egress block, wherein the transmit engine further comprises circuitry and logic to, partition the PIO send memory into a plurality of send contexts, each comprising a plurality of sequential send blocks;

receive inbound PCIe posted writes from a processor coupled to the PCIe interface via a PCIe interconnect, each PCIe posted write containing packet data corresponding to a packet stored in memory coupled to the processor and being written to a single send block via a PIO write instruction, wherein packet data for a given packet is written to one send block or a plurality of sequential send blocks, wherein packet data for a packet to be written to a plurality sequential send blocks is enabled to be received out of order;

detect when a plurality of sequential send blocks for a packet have been filled; and mark packet data in the plurality of sequential send blocks as eligible for egress to the egress block when all of the sequential send blocks for a packet are detected as being filled.

28. The apparatus to clause 27, further comprising circuitry and logic to implement an arbiter to select a packet from among packets in the plurality of send contexts that have been filled to be egressed from the egress block to the transmit port.

29. The apparatus of clause 27 or 28, wherein the transmit engine further comprises a send direct memory access (SDMA) memory and a plurality of SDMA engines configured to pull data from memory coupled to the processor using DMA transfers to write data to buffers in the SDMA memory.

30. The apparatus of any of clause 27-29, wherein the PCIe interfaces comprises a first PCIe interface, the apparatus further comprising:

a processor, having a plurality of processor cores supporting out of order execution and including a memory interface, at least one store buffer, and a second PCIe (Peripheral Component Interconnect Express) interface coupled to the first PCIe interface via a PCIe interconnect; further including circuitry and logic to, receive sequences of PIO write instructions to write packet data for respective packets stored in a memory when coupled to the memory interface to the PIO send memory;

execute the sequences of PIO write instructions as an instruction thread on a processor core, wherein execution of PIO write instructions cause data to be written to store units in a store buffer, the store units grouped into store blocks comprising a line of store units; wherein a portion of the PIO write instructions are executed out of order resulting in data being written to store units in different store blocks prior to the store blocks being filled;

detect when store blocks are filled; and in response to detecting a store block is filled, drain the data in the store block via a PCIe posted write to a buffer in the PIO send memory sent over the PCIe interconnect.

31. The apparatus of any of clauses 27-30, wherein the apparatus comprises a host fabric interface further comprising:

a receive engine, coupled to the PCIe interface; and a receive port, coupled to the receive engine.

32. The apparatus of clause 31, wherein the apparatus comprises multiple host fabric interfaces having a configuration defined for the host fabric interface of clause 31.

33. An apparatus, comprising:

a processor, having a plurality of processor cores supporting out of order execution and including a memory interface, at least one store buffer, and a first PCIe (Peripheral Component Interconnect Express) interface;

a second PCIe interface, coupled to the first PCIe interface of the processor via a PCIe interconnect; and a transmit engine operatively coupled to the second PCIe interface and including a Programmed Input/Output (PIO) send memory, wherein the processor further includes means for, receiving sequences of Programmed Input/Output (PIO) write instructions to write packet data for respective packets stored in a memory when coupled to the memory interface to the PIO send memory;

executing the sequences of PIO write instructions as an instruction thread on a processor core, wherein execution of PIO write instructions cause data to be written to store units in a store buffer, the store units grouped into store blocks comprising a line of store units; wherein a portion of the PIO write instructions are executed out of order resulting in data being written to store units in different store blocks prior to the store blocks being filled;

detecting when store blocks are filled; and in response to detecting a store block is filled, draining the data in the store block via a PCIe posted write to a buffer in the PIO send memory sent over the PCIe interconnect.

34. The apparatus of clause 33, wherein the memory employs 64-Byte (64 B) cache lines, each store block comprises 64 Bytes of data, and the posted write comprises a 64 B PCIe (Peripheral Component Interconnect Express) posted write.

35. The apparatus of clause 33 or 34, wherein the processor comprises a 64-bit processor, and each store unit comprises 64-bits of data that is written from a 64-bit data register in the processor to a store unit using a single instruction.

36. The apparatus of any of clauses 33-35, wherein the processor employs write-combining, and wherein execution of out of order PIO write instructions results in data being written to store units within a store block in a non-sequential order.

37. The apparatus of any of clauses 33-36, wherein the PIO send memory is partitioned into a plurality of send contexts, each send context organized as a sequence of send blocks, and wherein the apparatus includes further means for:

receiving a sequence of PIO write instructions for writing data for a packet to a plurality of sequential send blocks in a sequential order; and writing the data for the packet to the sequential send blocks in a non-sequential order.

38. The apparatus of clause 37, further comprising means for:

detecting that all of the plurality of sequential send blocks have been filled with the packet data; and enabling data in the plurality of send blocks to be egressed once all of the plurality of send blocks are filled.

39. The apparatus of clause 38, further comprising means for:

inspecting data in a first of the plurality of sequential send blocks to determine a length of the packet; and determining how many sequential send blocks are to be employed for storing data for the packet.

In general, the circuitry, logic and components depicted in the figures herein may also be implemented in various types of integrated circuits (e.g., semiconductor chips) and modules, including discrete chips, SoCs, multi-chip modules, and networking/link interface chips including support for multiple network interfaces. Also, as used herein, circuitry and logic to effect various operations may be implemented via one or more of embedded logic, embedded processors, controllers, microengines, or otherwise using any combination of hardware, software, and/or firmware. For example, the operations depicted by various logic blocks and/or circuitry may be effected using programmed logic gates and the like, including but not limited to ASICs, FPGAs, IP block libraries, or through one or more of software or firmware instructions executed on one or more processing elements including processors, processor cores, controllers, microcontrollers, microengines, etc.

In addition, aspects of embodiments of the present description may be implemented not only within a semiconductor chips, SoCs, multichip modules, etc., but also within non-transient machine-readable media. For example, the designs described above may be stored upon and/or embedded within non-transient machine readable media associated with a design tool used for designing semiconductor devices. Examples include a netlist formatted in the VHSIC Hardware Description Language (VHDL) language, Verilog language or SPICE language, or other Hardware Description Language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Italicized letters, such as 'M', 'G', 'B', 'n', 'm', 'k', etc. in the foregoing detailed description and the claims are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus, comprising:
    a processor, having a plurality of processor cores supporting out of order execution and including a memory interface, at least one store buffer, and a first Peripheral Component Interconnect Express (PCIe) interface;
    a second PCIe interface coupled to the first PCIe interface via a PCIe link;
    a transmit engine including,
        a Programmed Input/Output (PIO) send memory operatively coupled the second PCIe interface; and
        an egress block, operatively coupled to the PIO send memory; and
    a network port including a transmit port operatively coupled to the egress block, the processor further to,
        receive sequences of PIO write instructions to write packet data for respective packets stored in a memory when coupled to the memory interface to the PIO send memory;
        execute the sequences of PIO write instructions as an instruction thread on a processor core, wherein execution of PIO write instructions cause data to be written to store units in a store buffer, the store units grouped into store blocks, wherein a portion of the PIO write instructions are executed out of order resulting in data being written to store units in different store blocks prior to the store blocks being filled;
        detect when store blocks are filled; and
        in response to detecting a store block is filled, drain the data in the store block via a PCIe posted write to a send block in the PIO send memory sent over the PCIe interconnect, and
    the transmit engine further to,
        partition the PIO send memory into a plurality of send contexts, each comprising a plurality of sequential send blocks;
        receive inbound PCIe posted writes over the PCIe interconnect, wherein packet data for a given packet is written to one send block or a plurality of sequential send blocks, wherein packet data for a packet to be written to a plurality of sequential send blocks is enabled to be received out of order;
        detect when a plurality of sequential send blocks for a packet have been filled; and
        mark packet data in the plurality of sequential send blocks as eligible for egress to the egress block when all of the sequential send blocks for a packet are detected as being filled.

2. The apparatus to claim 1, further to implement an arbiter to select a packet from among packets in the plurality of send contexts that have been filled to be egressed from the egress block to the transmit port.

3. The apparatus of claim 1, wherein the transmit engine further comprises a send direct memory access (SDMA) memory and a plurality of SDMA engines to pull data from memory coupled to the processor using DMA transfers to write data to buffers in the SDMA memory.

4. The apparatus of claim 1, wherein the apparatus comprises a host fabric interface further comprising:
a receive engine, coupled to the PCIe interface; and
a receive port, coupled to the receive engine.

5. The apparatus of claim 4, wherein the apparatus comprises multiple host fabric interfaces having a configuration defined for the host fabric interface of claim 4.

6. The apparatus of claim 1, further to:
receive a sequence of PIO write instructions for writing data for a packet to a plurality of sequential send blocks in a sequential order; and
write the data for the packet to the sequential send blocks in a non-sequential order.

7. The apparatus of claim 6, further to:
detect that all of the plurality of sequential send blocks have been filled with the packet data; and
enable data in the plurality of send blocks to be egressed once all of the plurality of send blocks are filled.

8. The apparatus of claim 7, further to:
encode a header field in each packet with virtual lane (VL) indicia used to identify a VL associated with that packet;
enable packets with different VLs within the same send context to be egressed out of FIFO order; and
enforce FIFO ordering for egress of data for packets associated with the same VL within the same send context.

9. An apparatus, comprising:
a PCIe (Peripheral Component Interconnect Express) interface;
a transmit engine including,
a Programmed Input/Output (PIO) send memory operatively coupled the PCIe interface; and
an egress block, operatively coupled to the PIO send memory; and
a network port including a transmit port operatively coupled to the egress block, the transmit engine to,
partition the PIO send memory into a plurality of send contexts, each comprising a plurality of sequential send blocks;
receive inbound PCIe posted writes from a processor coupled to the PCIe interface via a PCIe interconnect, each PCIe posted write containing packet data corresponding to a packet stored in memory coupled to the processor and being written to a single send block via a PIO write instruction, wherein packet data for a given packet is written to one send block or a plurality of sequential send blocks, wherein packet data for a packet to be written to a plurality sequential send blocks is enabled to be received out of order;
detect when a plurality of sequential send blocks for a packet have been filled; mark packet data in the plurality of sequential send blocks as eligible for egress to the egress block when all of the sequential send blocks for a packet are detected as being filled;
detect that all of the plurality of sequential send blocks have been filled with the packet data;
enable data in the plurality of send blocks to be egressed once all of the plurality of send blocks are filled;
encode a header field in each packet with virtual lane (VL) indicia used to identify a VL associated with that packet;
enable packets with different VLs within the same send context to be egressed out of FIFO order; and
enforce FIFO ordering for egress of data for packets associated with the same VL within the same send context.

10. The apparatus to claim 9, further to implement an arbiter to select a packet from among packets in the plurality of send contexts that have been filled to be egressed from the egress block to the transmit port.

11. The apparatus of claim 9, wherein the transmit engine further comprises a send direct memory access (SDMA) memory and a plurality of SDMA engines to pull data from memory coupled to the processor using DMA transfers to write data to buffers in the SDMA memory.

12. The apparatus of claim 9, wherein the PCIe interfaces comprises a first PCIe interface, the apparatus further comprising:
a processor, having a plurality of processor cores supporting out of order execution and including a memory interface, at least one store buffer, and a second PCIe (Peripheral Component Interconnect Express) interface coupled to the first PCIe interface via a PCIe interconnect;
the apparatus further to,
receive sequences of PIO write instructions to write packet data for respective packets stored in a memory when coupled to the memory interface to the PIO send memory;
execute the sequences of PIO write instructions as an instruction thread on a processor core, wherein execution of PIO write instructions cause data to be written to store units in a store buffer, the store units grouped into store blocks comprising a line of store units; wherein a portion of the PIO write instructions are executed out of order resulting in data being written to store units in different store blocks prior to the store blocks being filled;
detect when store blocks are filled; and
in response to detecting a store block is filled, drain the data in the store block via a PCIe posted write to a buffer in the PIO send memory sent over the PCIe interconnect.

13. The apparatus of claim 9, wherein the apparatus comprises a host fabric interface further comprising:
a receive engine, coupled to the PCIe interface; and
a receive port, coupled to the receive engine.

14. The apparatus of claim 13, wherein the apparatus comprises multiple host fabric interfaces having a configuration defined for the host fabric interface of claim 13.

* * * * *